US012782500B2

(12) United States Patent
Murphy et al.

(10) Patent No.: US 12,782,500 B2
(45) Date of Patent: Nov. 3, 2026

(54) COMBINED RADIO ALTIMETER AND DOPPLER RADAR WITH SURFACE-MOUNTABLE ANTENNA ARRAY

(71) Applicant: THE BOEING COMPANY, Arlington, VA (US)

(72) Inventors: Timothy Allen Murphy, Marysville, WA (US); Rongsheng Li, Menifee, CA (US); Alireza Shapoury, Santa Ana, CA (US)

(73) Assignee: THE BOEING COMPANY, Arlington, VA (US)

( * ) Notice: Subject to any disclaimer, the term of this patent is extended or adjusted under 35 U.S.C. 154(b) by 323 days.

(21) Appl. No.: 18/627,220

(22) Filed: Apr. 4, 2024

(65) Prior Publication Data

US 2025/0314740 A1 Oct. 9, 2025

(51) Int. Cl.
*G01S 7/03* (2006.01)
*G01S 13/60* (2006.01)
*G01S 13/88* (2006.01)

(52) U.S. Cl.
CPC ................ *G01S 7/03* (2013.01); *G01S 13/60* (2013.01); *G01S 13/882* (2013.01)

(58) Field of Classification Search
CPC ........... G01S 7/03; G01S 13/60; G01S 13/882
See application file for complete search history.

(56) References Cited

U.S. PATENT DOCUMENTS 7,576,686 B2 8/2009 Needham et al.
9,939,524 B2 4/2018 Winstead
10,006,991 B2 6/2018 Winstead et al.
10,989,802 B2 4/2021 Pos et al.
11,131,751 B2 9/2021 Steinmetz
11,658,398 B1 5/2023 Downey et al.
12,158,538 B2 12/2024 Longman
12,181,602 B2 12/2024 Green et al.
12,235,386 B2 2/2025 Bar-Shalom et al.
12,494,592 B2 12/2025 Bar Shalom et al.
(Continued)

FOREIGN PATENT DOCUMENTS

EP 3379295 A1 9/2018

OTHER PUBLICATIONS

Extended European Search Report for application No. 2518772.1 dated Jul. 25, 2025, pp. 1-11.

*Primary Examiner* — Vladimir Magloire
*Assistant Examiner* — Hailey R Le
(74) *Attorney, Agent, or Firm* — Moore IP Law

(57) ABSTRACT

A method includes generating an output radio frequency (RF) signal. The method includes communicating the output RF signal to an antenna module. The method includes receiving a bit stream from the antenna module. The bit stream includes data representing the output RF signal prior to transmission of an output RF waveform associated with the output RF signal at the antenna module and data representing a return RF signal associated with a return RF waveform received at the antenna module following transmission of the output RF waveform as part of a sensing operation. The method includes analyzing one or more values of the data representing the return RF signal to generate an altitude indication for a vehicle, a ground speed indication for the vehicle, or a combination thereof.

20 Claims, 11 Drawing Sheets

(56) References Cited

U.S. PATENT DOCUMENTS

| | | | | |
|---|---|---|---|---|
| 2003/0189974 | A1* | 10/2003 | Ferry | H04B 1/50 375/219 |
| 2006/0044182 | A1* | 3/2006 | Vacanti | G01S 7/034 342/120 |
| 2010/0259446 | A1* | 10/2010 | Corman | H03H 11/36 342/368 |
| 2011/0006940 | A1* | 1/2011 | Andersson | G01S 7/2923 342/28 |
| 2011/0078355 | A1* | 3/2011 | Tan | G06F 13/4273 710/305 |
| 2011/0279669 | A1* | 11/2011 | Longstaff | G01S 13/913 348/135 |
| 2018/0074185 | A1* | 3/2018 | Capraro | G01S 13/5244 |
| 2018/0252809 | A1* | 9/2018 | Davis | G01S 7/0233 |
| 2021/0208247 | A1 | 7/2021 | John Wilson et al. | |
| 2021/0263132 | A1* | 8/2021 | Ranney | G01S 13/9058 |
| 2024/0361466 | A1 | 10/2024 | Weger | |
| 2025/0314740 | A1 | 10/2025 | Murphy et al. | |
| 2025/0317170 | A1 | 10/2025 | Murphy et al. | |

* cited by examiner

COMBINED RADIO ALTIMETER AND DOPPLER RADAR WITH SURFACE-MOUNTABLE ANTENNA ARRAY

FIELD OF THE DISCLOSURE

The present disclosure is generally related to a radio device that includes a surface-mountable antenna array and is configured to operate as a combined radio altimeter and Doppler radar.

BACKGROUND

As technology advances, global positioning satellite (GPS)-based navigation systems have become a common type of navigation system employed by aircraft and other long-range vehicles. GPS-based navigation systems use radio communications between an aircraft and satellites to derive accurate location information for the aircraft during flight. GPS-based navigation systems have grown in popularity due to their accuracy and reliability, as well as being easier and cheaper to deploy and calibrate than other types of navigation systems. However, GPS-based navigation systems can have some drawbacks, including being unable to function in areas in which the availability and quality of satellite signals is insufficient, as well as experiencing interference from other wireless communications and the possibility of being jammed or spoofed by malicious entities.

To compensate for these drawbacks in GPS-based navigation systems, aircraft are often equipped with other sensors or inertial navigation systems that can be used to determine measurements, such as altitude, speed, orientation, or the like, that can be used in place of, or to supplement, GPS-based location measurements. One type of sensor that is often deployed with the aircraft is a radio altimeter, which typically includes an antenna mounted to a surface of the aircraft and a line replaceable unit (LRU) that sends radio frequency (RF) signals to and receives return RF signals from the antenna via RF cabling. The radio altimeter is configured to measure a height of the aircraft above the ground using a transmitted RF wave and a reflected RF wave from the ground below the aircraft. These radio altimeters can introduce additional fault conditions and design requirements, and can also be subject to interference, jamming, or spoofing.

In addition to radio altimeters, Doppler radars have been deployed in order to measure ground speed independent of GPS or inertial measurements. Prior to the availability of GPS, Doppler radars were deployed and integrated with inertial systems to improve platform navigation performance. As the availability of GPS increased, the effectiveness and low cost of using GPS for calibrating inertial measurement systems led to decreased demand for Doppler radars. However, as wireless communication technology has evolved, incidents of denial of GPS service, such as due to jamming or spoofing, and interference from other wireless communication technologies has reduced the reliability of GPS-supported inertial navigation systems.

SUMMARY

In a particular implementation, a surface-mountable antenna module includes a housing configured to mount to an external surface of a vehicle. The surface-mountable antenna module also includes a receiver configured to receive an output radio frequency (RF) signal. The surface-mountable antenna module includes an antenna configured to transmit the output RF signal and receive a return RF signal. The surface-mountable antenna module also includes circuitry coupled to the antenna. The circuitry is configured to generate a digitized output RF signal and generate a digitized return RF signal. The surface-mountable antenna module further includes an electrical connector coupled to the circuitry. The electrical connector is configured to output data representing the digitized output RF signal and the digitized return RF signal.

In another particular implementation, a radio device includes an RF unit that includes a transmitter configured to transmit an output RF signal, a first receiver configured to receive a bit stream, and a processing unit configured to analyze a portion of the bit stream to determine an altitude measurement for a vehicle, a speed measurement for the vehicle, or a combination thereof. The radio altimeter also includes a surface-mountable antenna module configured to be coupled to the RF unit. The surface-mountable antenna module includes a housing configured to mount to an external surface of the vehicle, a second receiver configured to receive the output RF signal, and an antenna configured to transmit the output RF signal and receive a return RF signal. The surface-mountable antenna module also includes circuitry coupled to the first receiver and the second receiver. The circuitry is configured to generate a digitized output RF signal and generate a digitized return RF signal. The surface-mountable antenna module further includes an electrical connector coupled to the circuitry. The electrical connector is configured to communicate the digitized output RF signal and the digitized return RF signal as part of the bit stream.

In another particular implementation, an aircraft includes a radio device and a navigation display coupled to the radio device. The radio device includes an RF unit and a surface-mountable antenna module coupled to the RF unit. The RF unit includes a transmitter configured to transmit an output RF signal, a first receiver configured to receive a bit stream, and a processing unit configured to analyze a portion of the bit stream to determine an altitude measurement for the aircraft, a speed measurement for the aircraft, or a combination thereof. The surface-mountable antenna module includes a housing configured to mount to an external surface of the aircraft, a second receiver configured to receive the output RF signal, and an antenna configured to transmit the output RF signal and receive a return RF signal. The surface-mountable antenna module also includes circuitry coupled to the first receiver and the second receiver. The circuitry is configured to generate a digitized output RF signal and generate a digitized return RF signal. The surface-mountable antenna module further includes an electrical connector coupled to the circuitry. The electrical connector is configured to communicate the digitized output RF signal and the digitized return RF signal as part of the bit stream. The navigation display is configured to display an altitude reading based on the bit stream.

In another particular implementation, a method includes generating an output RF signal. The method also includes communicating the output RF signal to an antenna module. The method includes receiving a bit stream from the antenna module. The bit stream includes data representing the output RF signal prior to transmission of an output RF waveform associated with the output RF signal at the antenna module and data representing a return RF signal associated with a return RF waveform received at the antenna module following transmission of the output RF waveform as part of a sensing operation. The method further includes analyzing one or more values of the data representing the return RF signal to generate an altitude indication for a vehicle, a ground speed indication for the vehicle, or a combination thereof.

In another particular implementation, a system includes one or more processors configured to generate an output RF signal. The one or more processors are also configured to communicate the output RF signal to an antenna module. The one or more processors are configured to receive a bit stream from the antenna module. The bit stream includes data representing the output RF signal prior to transmission of an output RF waveform associated with the output RF signal at the antenna module and data representing a return RF signal associated with a return RF waveform received at the antenna module following transmission of the output RF waveform as part of a sensing operation. The one or more processors are further configured to analyze one or more values of the data representing the return RF signal to generate an altitude indication for a vehicle, a ground speed indication for the vehicle, or a combination thereof.

In another particular implementation, a non-transitory, computer-readable medium stores instructions that, when executed by one or more processors, cause the one or more processors to perform operations including generating an output RF signal. The operations also include communicating the output RF signal to an antenna module. The operations include receiving a bit stream from the antenna module. The bit stream includes data representing the output RF signal prior to transmission of an output RF waveform associated with the output RF signal at the antenna module and data representing a return RF signal associated with a return RF waveform received at the antenna module following transmission of the output RF waveform as part of a sensing operation. The operations further include analyzing one or more values of the data representing the return RF signal to generate an altitude indication for a vehicle, a ground speed indication for the vehicle, or a combination thereof.

In another particular implementation, a method includes receiving an output RF signal. The method also includes generating a digitized output RF signal representing the output RF signal. The method includes transmitting an output RF waveform associated with the output RF signal. The method also includes receiving a return RF waveform based on transmission of the output RF waveform. The method includes generating a digitized return RF signal representing a return RF signal associated with the return RF waveform. The method also includes serializing the digitized output RF signal and the digitized return RF signal to generate a serialized baseband signal. The method further includes communicating a bit stream based on the serialized baseband signal to an RF unit. The RF unit is configured to generate an altitude measurement, a ground speed measurement, or both for a vehicle based on the serialized baseband signal.

In another particular implementation, a system includes one or more processors that are configured to receive an output RF signal. The one or more processors are also configured to generate a digitized output RF signal representing the output RF signal. The one or more processors are configured to transmit an output RF waveform associated with the output RF signal. The one or more processors are also configured to receive a return RF waveform based on transmission of the output RF waveform. The one or more processors are configured to generate a digitized return RF signal representing a return RF signal associated with the return RF waveform. The one or more processors are also configured to serialize the digitized output RF signal and the digitized return RF signal to generate a serialized baseband signal. The one or more processors are further configured to communicate a bit stream based on the serialized baseband signal to an RF unit. The RF unit is configured to generate an altitude measurement, a ground speed measurement, or both for a vehicle based on the serialized baseband signal.

In another particular implementation, a non-transitory, computer-readable medium stores instructions that, when executed by one or more processors, cause the one or more processors to perform operations including receiving an output RF signal. The operations also include generating a digitized output RF signal representing the output RF signal. The operations include transmitting an output RF waveform associated with the output RF signal. The operations also include receiving a return RF waveform based on transmission of the output RF waveform. The operations include generating a digitized return RF signal representing a return RF signal associated with the return RF waveform. The operations also include serializing the digitized output RF signal and the digitized return RF signal to generate a serialized baseband signal. The operations further include communicating a bit stream based on the serialized baseband signal to an RF unit. The RF unit is configured to generate an altitude measurement, a ground speed measurement, or both for a vehicle based on the serialized baseband signal.

The features, functions, and advantages described herein can be achieved independently in various implementations or may be combined in yet other implementations, further details of which can be found with reference to the following description and drawings.

DETAILED DESCRIPTION

Figure 1:
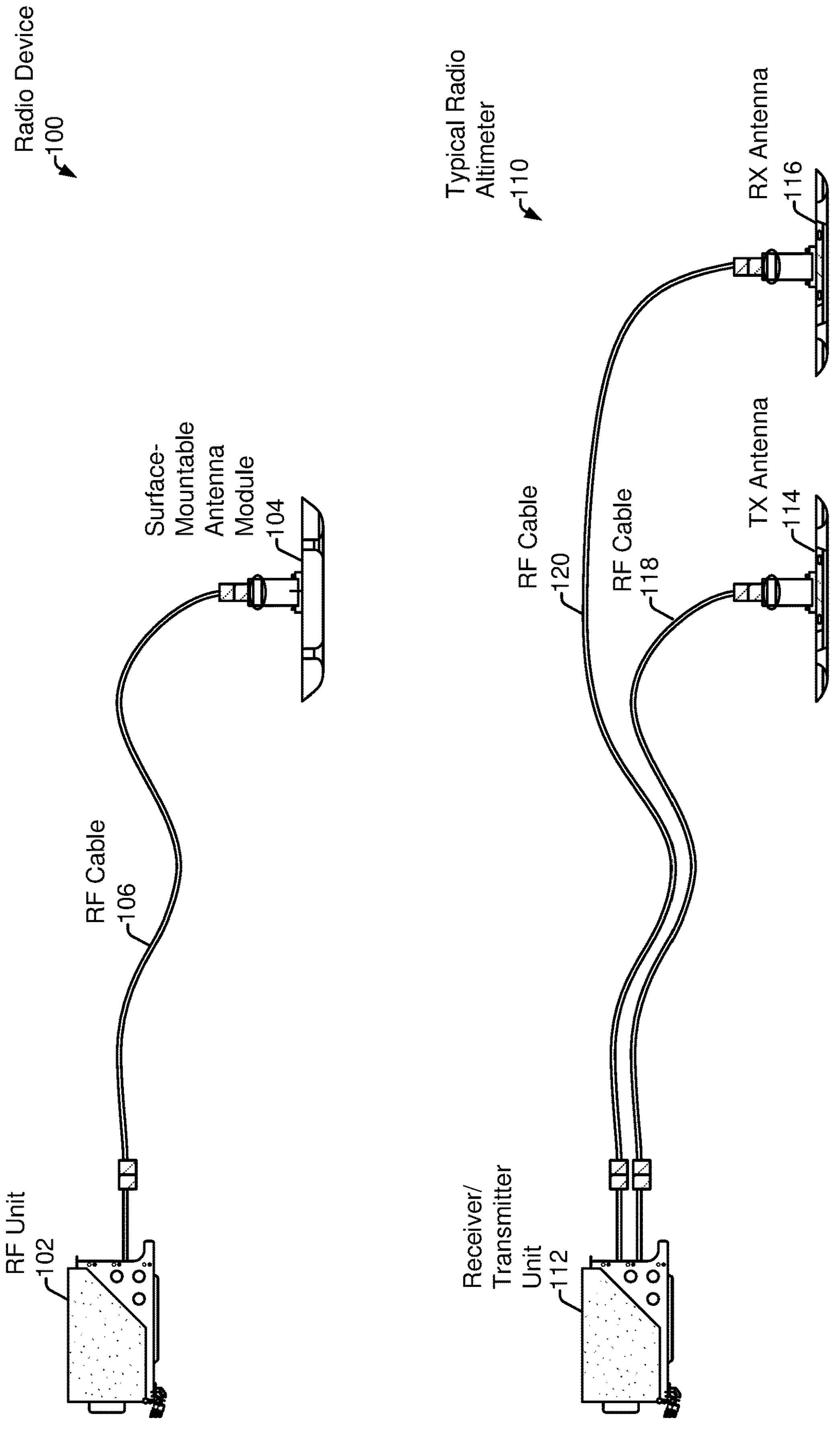
FIG. 1 is a diagram that illustrates an example of a radio device that combines radio altimeter and Doppler radar functionality and that includes a surface-mountable antenna array according to one or more aspects of the present disclosure.

Aspects disclosed herein present systems and methods for determining altitude, ground speed, and other measurements of a vehicle that do not rely on global positioning satellite (GPS) data, and in particular, systems and methods that leverage a radio device that combines radio altimeter and Doppler radar functionality and that includes a surface-mountable antenna array for use on vehicles, such as aircraft. The radio device (e.g., a combined radio altimeter and Doppler radar) may be realized through a particular arrangement of digitization at the surface-mountable antenna array. The radio device of the present disclosure can be used to supplement location information from a GPS-based navigation system or other navigation system, such as an inertial navigation system (INS) or an inertial reference system (IRS), or to provide location-related information such as altitude and ground speed of a vehicle in situations in which the performance of the GPS-based navigation system is degraded or experiencing a GPS denied status. As used herein, a "GPS denied" status refers to a status indicating that a GPS-based navigation system is not capable of determining an accurate location of the vehicle or, in the case of spoofing the GPS-based navigation system, that the GPS-based navigation system is outputting erroneous information without annunciation. The radio device of the present disclosure can operate as a multi-mode navigation radar by combining radio altimeter functionality and Doppler radar functionality to generate altitude measurement data, ground speed measurement data, or a combination thereof. It should be understood that the radio altimeter functionality or the Doppler radar functionality may be optional, such that the radio device described herein can be configured to provide radio altimeter functionality, Doppler radar functionality, or both functionalities.

Additionally, the radio device of the present disclosure can be more robust and less prone to failures than other types of radio altimeters due to distribution of various operations between a processing unit and circuitry included in the surface-mountable antenna array. The radio device (e.g., the combined multi-mode navigational radar) described herein can also have a substantially similar footprint (e.g., form factor) to currently-deployed radio altimeters, such that the currently-deployed radio altimeters can be replaced with the radio device of the present disclosure during vehicle retrofits that are relatively easy and inexpensive. Implementations of the radio device described herein can also be configured to use radio frequency (RF) waveforms and frequency ranges that are robust to interference from other wireless communication technologies, as well as being configured to reduce or prevent jamming and spoofing by malicious entities.

In some implementations, a radio device includes an RF unit and a surface-mountable antenna module coupled to the RF unit by an RF cable. The surface-mountable antenna module includes an antenna array and circuitry configured to facilitate transmission and reception of RF signals via the antenna array. The circuitry is also configured to down-convert the RF signals to baseband and to generate digitized data of samples of the down-converted signal, serialized into a bit stream, that is communicated to the RF unit and that represents transmitted and received RF signals at the antenna array. The bit stream may represent digitized samples of in-phase and quadrature components of the RF signals, as further described herein. In some implementations, the surface-mountable antenna module comprises a single aperture radar with RF electronics (e.g., circuitry) to perform RF transmission, RF reception, and digitization at the antenna module. In such implementations, the surface-mountable antenna module is configured to communicate a serialized bit stream of digitized data via the RF cable to the RF unit, in contrast to conventional radio altimeters in which a receiver communicates received RF signals in an analog form via RF cables to an RF unit. Because the received RF signals are processed, digitized, and serialized at the surface-mountable antenna module, instead of being communicated to the RF unit for processing and digitization, leakage associated with RF cables and connectors does not affect the accuracy and integrity of measurements derived from the digitized data. Additionally, because digitization of the transmitted and received RF signals is performed at the surface-mountable antenna module, there is no requirement for the RF cable to be one of a set of predetermined lengths, which is a stringent requirement for conventional radio altimeters in which the length of the RF cable contributes to the difference in time between processing of an output RF signal and a return RF signal. As such, the radio device of the present disclosure can be deployed to a wider variety of vehicles and in a wider variety of positions along the surface of the vehicles due to the lack of cable length requirements, as compared to other radio altimeters in which RF cables are sized to a next largest predetermined size, which can require additional storage space in the aircraft to be used to store coiled up excess RF cables.

In some implementations, the antenna array of the radio device, in combination with the additional circuitry, is designed and sized to fit the form factor of existing radio altimeters. As a particular example, a mounting hole arrangement for the antenna array may match mounting hole arrangements of existing radio altimeters. Such design and sizing enables retrofitting aircraft to replace existing radio altimeters with the radio device of the present disclosure without the added cost or complexity of having to mount larger equipment or change a relative position of the radio device, which can also require additional wiring or other modifications to enable installation of the radio device. In some implementations, the radio device of the present disclosure is configured to perform radar functions in a particular frequency band, such as the 13.25 gigahertz (GHz) to 13.4 GHz band, that is selected to reduce interference from other wireless communication technologies and to operate in a frequency band that is designated worldwide for aeronautical Doppler radar operations, thereby improving the robustness of the radio device. Additionally, or alternatively, the antenna array can be configured to perform beamforming to enable transmission and reception of RF waveforms for altitude measurements and Doppler radar-based speed measurements in various directions from the antenna array. In some such implementations, the beamforming is passive beamforming performed using a preconfigured beamforming network, such as a two-dimensional Butler Matrix as a non-limiting example. In some other implementations, the beamforming is active beamforming performed using an adaptive beamforming network.

Additionally, or alternatively, the radio device can be configured to perform wireless transmission and reception of information using RF waveforms and codes that are designed to improve performance and to reduce or eliminate spoofing by malicious entities. For example, the radio device can be configured to use orthogonal frequency division multiplexing (OFDM) waveforms or direct sequence spread spectrum (DSSS) waveforms which have long sequences of pseudo-random noise and, assuming no communication bits are included, low post-correlation bandwidth, thus enabling high processing gain and reduced interference from other types of wireless communications. As another example, the radar waveforms used to perform the altimeter and Doppler-based measurement functionality can be generated pseudo-randomly, such that the antenna array module can authenticate return RF signals by comparing received messages to the transmitted messages to authenticate the return RF signals. Return RF signals that are successfully authenticated can be processed, and return RF signals that fail authentication can be discarded, thereby preventing spoofing or fraudulent signals from being used to generate measurements without requiring the complexity of cryptographic coding of the messages and associated key management.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, a system may be described herein as including one or more computing devices ("computing device(s)"), which indicates that in some implementations the system includes a single computing device and in other implementations the system includes multiple computing devices. For ease of reference herein, such features are generally introduced as "one or more" features, and are subsequently referred to in the singular or optional plural (as typically indicated by "(s)") unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts an example of a radio device 100 that includes a surface-mountable antenna array according to one or more aspects of the present disclosure. The radio device 100 may operate as a combined radio altimeter and Doppler radar that provides radio altimeter functionality, Doppler radar functionality, or both functionalities, as further described below. For comparison, FIG. 1 also depicts a typical radio altimeter 110 that conforms to a popular form, fit, and function standard.

The radio device 100 is configured to output measurement data, such as altitude data, position data, ground speed data, or a combination thereof, for use by a navigation system of a vehicle. In some implementations, the radio device 100 can be configured to output ground speed measurement data to an inertial navigation system (INS) or an inertial reference system (IRS) of an aircraft, as further described herein. The radio device 100 includes a radio frequency (RF) unit 102, a surface-mountable antenna module 104, and an RF cable 106.

The RF unit 102 and the surface-mountable antenna module 104 are interconnected via the RF cable 106 to enable digital signal communication between the RF unit 102 and the surface-mountable antenna module 104. The RF unit 102 and the surface-mountable antenna module 104 can be positionally distributed from each other with respect to a vehicle. For example, the RF unit 102 can be located in, or adjacent to, a cabin, cockpit, or electronics bay of a vehicle, such as an aircraft, and the surface-mountable antenna module 104 can be mountable to a bottom surface of the aircraft (e.g., a bottom surface with reference to a typical orientation of the aircraft during normal flight, such that the bottom surface is closest to ground during a substantial portion of the flight), as further described herein with reference to FIG. 5. Although described as being mountable on the bottom surface of the aircraft, in other implementations, the surface-mountable antenna module 104 can be mountable on any surface of the aircraft based on available surface real estate, performance of the antenna, other considerations, or a combination thereof. As such, the RF cable 106 can have any arbitrary length that is selected to provide sufficient cable to couple the RF unit 102 and the surface-mountable antenna module 104 based on the respective positions, and not any particular predetermined length or size. For example, the length of the RF cable 106 is not required to be one of a set of preconfigured cable lengths, such as 40, 57, or 80 feet as is common to comply with an Aeronautical Radio, Inc. (ARINC) 707 standard, and instead the length of the RF cable 106 can be selected based on the distance between the RF unit 102 and the surface-mountable antenna module 104 and available cable routing paths therebetween. ("ARINC" is a registered trademark of ARINC Incorporated of Annapolis, Maryland). In some implementations, different types of aircraft (or other vehicles) can have different distances between the respective RF unit 102 and the respective surface-mountable antenna module 104, and thus the RF cable 106 of different types of aircraft can have different respective lengths. In some implementations, the RF cable 106 includes or corresponds to RF coaxial cable that is compliant with an ARINC 707 standard (e.g., is ARINC 707 compliant) or with another aeronautical technical standard.

The RF unit 102 includes a processor, such as a digital signal processor (DSP), which can be coupled to a memory, a transmitter, and a receiver, and in combination these components can be configured to enable performance of the operations described herein with reference to the RF unit 102. Because the RF unit 102 is configured to manage input and output signals to the surface-mountable antenna module 104 and to perform computations to generate measurement data, the RF unit 102 can also be referred to as a computation and input/output (I/O) unit. Although described as including a processor or a DSP, in other implementations, one or more operations described as being performed by the RF unit 102 can be implemented using another type of processor, dedicated hardware, firmware, or a combination thereof. Such hardware can include an application-specific integrated circuit (ASIC) or a field-programmable gate array (FPGA), as illustrative examples. In some implementations, the memory includes a computer-readable medium that stores instructions that are executable by the processor (e.g., the DSP). The instructions are executable to initiate, perform or control operations to aid in deserialization of a bit stream that represents RF signals from the surface-mountable antenna module 104 and generation of measurement data based on the deserialized data. In some implementations, the RF unit 102 includes additional circuitry configured to support performance of the operations described herein. The additional circuitry can include a digital-to-analog converter, a power amplifier, a diplexer, a demodulator, a deserializer, other circuitry, or a combination thereof, as further described with reference to FIG. 2. In some implementations, the RF unit 102 can include or correspond to a line replaceable unit (LRU) of the aircraft. As such, the RF unit 102 can be a fully functional modular unit that is designed to be replaced during field-level or intermediate-level maintenance of the aircraft. The RF unit 102 can also include an electrical connector configured to be coupled to the receiver and to the RF cable 106. In some implementations, the electrical connector includes or corresponds to a coaxial cable connector. Additionally, or alternatively, the electrical connector can be ARINC 707 compliant.

The surface-mountable antenna module 104 includes a housing that is configured to be coupled to a surface of a vehicle, such as an aircraft. For example, the housing can include an outer surface or one or more walls that enclose other components of the surface-mountable antenna module 104 and that is configured to be coupled to the surface of the vehicle, such as via screws or other fasteners. In some implementations, the housing can include or encompass a hermetically sealed compartment, as further described herein. In some implementations, the housing can be coupled to a bottom surface of an aircraft, such that the surface-mountable antenna module 104 is mountable on the underside of the aircraft, with respect to the orientation of the aircraft during a substantial portion of flight. Although some examples disclosed herein are described in the context of an aircraft, the present disclosure is not so limited, and the radio device 100 can be mountable on the surface of other vehicles according to other aspects of this disclosure.

Within the housing, the surface-mountable antenna module 104 includes a receiver, a transmitter, an antenna, circuitry, and at least a portion of an electrical connector. The receiver can be configured to receive an output RF signal from the transmitter of the RF unit 102. The antenna can be configured to transmit the output RF signal and to receive a return RF signal based on the output RF signal, such as during a process to generate altitude measurement data by the radio device 100. In some implementations, the antenna includes or corresponds to an antenna array, such as a 9×8 antenna array or a 14×13 antenna array, as non-limiting examples. The antenna array can be configured to support beamforming, as further described herein. The circuitry can be coupled to the receiver and the transmitter to enable communication of data that represents digitized RF signals between the surface-mountable antenna module 104 and the RF unit 102. For example, the circuitry can be configured to generate a digitized output RF signal and a digitized return RF signal based on the output RF signal and the return RF signal, respectively. The transmitter can be configured to transmit, via the electrical connector and the RF cable 106, bit streams representative of the digitized RF signals, as further described herein. The electrical connector is coupled to the receiver and to the RF cable 106. In some implementations, the electrical connector includes or corresponds to a coaxial cable connector. Additionally, or alternatively, the electrical connector can be ARINC 707 compliant. Because the RF signals are digitized at the circuitry of the surface-mountable antenna module 104, and thus the RF cable 106 communicates digitized data as bit streams, the RF cable 106 can have a length that is substantially equal to the distance between the RF unit 102 and the surface-mountable antenna module 104, and the measurement data derived from the bit streams received at the RF unit 102 is not dependent on the length of the RF cable 106. Stated another way, the RF cable 106 is not constrained to have a length within a set of predetermined lengths or the surface-mountable antenna module 104 is agnostic as to a length of the RF cable 106.

The typical radio altimeter 110 includes a receiver/transmitter unit 112, a transmit antenna 114, a receive antenna 116, a first RF cable 118 that couples the receiver/transmitter unit 112 to the transmit antenna 114, and a second RF cable 120 that couples the receiver/transmitter unit 112 to the receive antenna 116. The receiver/transmitter unit 112 is configured to generate an output RF signal for transmission by the transmit antenna 114 and to perform RF processing and demodulation on a return RF signal received by the receive antenna 116, in addition to digital signal processing associated with analyzing the signals to generate altitude measurements. Because the digital signal processing and demodulation are performed by the receiver/transmitter unit 112, the first RF cable 118 and the second RF cable 120 are configured to communicate RF signals between the receiver/transmitter unit 112 and the respective antenna, as compared to communicating a digitized bit stream such as the bit stream communicated by the RF cable 106. For this reason, the length of the RF cables 118, 120 affects the RF signals being communicated, and thus the receiver/transmitter unit 112 is configured to perform calculations to compensate for the effect of the RF cables 118, 120 when processing the RF signals. To reduce the complexity of the compensation calculations, the length of the RF cables 118, 120 are constrained to a set of predetermined lengths, in some examples 40 feet, 57 feet, or 80 feet, such that computations can be limited by one of three values. To provide the receiver/transmitter unit 112 with knowledge of the length of each of the RF cables 118, 120, an indicator on the respective cable connectors can be configured to indicate a length of 40 feet, 57 feet, or 80 feet, such as by placing a jumper on one of three corresponding pins on the connector, or in a similar manner. If the distance between the receiver/transmitter unit 112 and the antennas 114, 116 is between any of the preconfigured lengths, the remaining cabling is spooled, coiled, or otherwise stored in the aircraft, using space that could otherwise be used to store other components or serve other purposes. Additionally, each RF connector (e.g., at the transmit antenna and the receive antenna 116) represents a potential failure mode that can impact measurement integrity or accuracy of altitude measurements generated by the receiver/transmitter unit 112. For example, signal leakage at an RF connector on the transmit signal path (e.g., from the transmit antenna 114 to the receiver/transmitter unit 112) can result in energy coupling into the receive antenna 116, leading to an inaccurate altitude reading.

In contrast to the typical radio altimeter 110, the radio device 100 includes a single aperture antenna (e.g., the surface-mountable antenna module) instead of two antennas. In some implementations in which the radio device 100 is retrofitted in place of the typical radio altimeter 110, a plate may act as a cap or covering for an opening that previously housed a second antenna prior to the retrofit. Removing an antenna and operating only a single antenna (e.g., the surface-mountable antenna module 104) and connecting cable can reduce the overall weight of the system as compared to operating the two antennas 114, 116 of the typical radio altimeter 110.

During operation of the radio device 100, the RF unit 102 can generate an output RF signal for use in performing measurements associated with the aircraft. In some examples, the output RF signal is used to perform an altitude measurement, and thus can be referred to as an altitude signal. In some other examples, the output RF signal can be used to perform a Doppler-based speed measurement, and thus can be referred to as a Doppler signal. In some implementations, the RF unit 102 can generate the output RF signal based on a status of another type of navigation system of the aircraft. For example, the RF unit 102 can generate one or more types of output RF signal based on current availability and/or performance of a GPS-based navigation system or module including, for example, experiencing a global positioning system denied ("GPS-denied") status, which can occur due to lack of clear line of sight to a sufficient number of GPS satellites, unintended interference from other wireless communication technologies being operated in the vicinity of the aircraft, or due to jamming or spoofing of the GPS signals by a malicious entity.

In some implementations, the output RF signal is associated with an output RF waveform having a frequency in a range from approximately 13.25 GHz to approximately 13.4 GHz, which is a particular frequency band that is designated for use by the Earth Exploration-Satellite Service (EESS), the Aeronautical Radionavigation Service (ARNS), and the Space Research Service (SRS) by the International Telecommunications Union (ITU). In such implementations, transmission and/or reception of waveforms in this frequency band are reserved for a subset of services, and thus are less likely to experience interference from other wireless communications technologies, such as 5G or other current or future cellular communications technologies. In other implementations, the output RF signal can have a frequency that is in a different frequency band, such as a frequency band selected based on allocations in other countries or according to other organizations.

Additionally, or alternatively, the output RF signal can be associated with an orthogonal frequency division multiplexing (OFDM) modulation scheme, such that the data to be transmitted using the output RF signal is multiplexed on multiple closely spaced orthogonal subcarriers. Employing an OFDM modulation scheme for the output RF signal can improve the quality of range and resolution of the radar, particularly in poor channel conditions, due to the improved signal-to-noise ratio and cross correlation properties offered by OFDM modulation. Additionally, or alternatively, the output RF signal can be associated with a Direct Sequence Spread Spectrum (DSSS) modulation scheme, such that a carrier to be transmitted using the output RF signal may be modulated by a pseudo-random bit stream or code that causes the spectrum of the transmission to be spread. DSSS modulation schemes also offer signal-to-noise benefits through processing gain and have excellent cross correlation properties, thus allowing measurement of range and relative Doppler of the return signal. In other implementations, the output RF signal can be associated with other types of modulation or coding schemes. In some implementations, each RF waveform may be associated with an individual respective modulation scheme, such that some RF waveforms are associated with OFDM modulation schemes and others are associated with DSSS modulation schemes. The waveforms may be selected from a preset family of waveforms that are randomly generated and modulated to prevent or reduce the likelihood of spoofing.

The RF unit 102 can communicate the output RF signal to the surface-mountable antenna module 104 via the RF cable 106. The surface-mountable antenna module 104 can cause the output RF signal to be transmitted via the antenna. The output RF signal can be transmitted as an output RF waveform as part of a radio altimeter and/or Doppler radar operation. In some implementations, transmission of the output RF signal can include beamforming the output RF signal, as further described with reference to FIGS. 2-5. For example, the RF unit 102 can generate a beamforming control signal that includes data indicative of a selected beamforming pattern, a beamforming sequence location, or a combination thereof, and the RF unit 102 can communicate the beamforming control signal to the surface-mountable antenna module 104. The surface-mountable antenna module 104 can receive the beamforming control signal and perform the beamforming according to the selected beamforming pattern, the beamforming sequence location, or a combination thereof. The beamforming performed by the surface-mountable antenna module 104 can include passive beamforming or active beamforming (e.g., the beamforming pattern can include or correspond to a preconfigured beamforming network configuration or an active beamforming network configuration), as further described herein.

In response to transmission of the output RF signal, the antenna of the surface-mountable antenna module 104 can receive a return RF signal. For example, the return RF signal can be a reflection of the output RF signal that is returned by the ground below the aircraft during flight. The surface-mountable antenna module 104 can process the return RF signal to generate a digitized return RF signal, in addition to processing the transmitted RF output signal to generate a digitized output RF signal. The surface-mountable antenna module 104 can digitize and serialize the digitized output RF signal and the digitized return RF signal to generate a serialized baseband signal, and the surface-mountable antenna module 104 can communicate the serialized baseband signal as a bit stream to the RF unit 102 via the RF cable 106. In some implementations, serializing the digitized RF signals can include modulating the digitized RF bit stream onto a different frequency than the output RF signal to generate a serialized, modulated baseband signal that is communicated to the RF unit 102. To illustrate, the surface-mountable antenna module 104 can down-convert the output RF signal and the return RF signal to baseband, and the down-converted signals can be sampled at a rate that is sufficient to cover the working frequency of the RF signals in order to generate digitized samples of the output RF signal and the return RF signal that represent the in-phase and quadrature (I and Q) components of the RF signals. As a non-limiting example, if the working frequency of the RF signals is within the range of approximately 13.25 GHz to 13.4 GHz, the sampling rate is approximately 300 mega samples per second (MS/s) or greater. In some examples, these digitized samples of the in-phase and quadrature components are serialized as the bit stream that is provided to the RF unit 102 by the surface-mountable antenna module 104.

The RF unit 102 can demodulate the serialized bit stream and deserialize the digitized signals to extract the digitized baseband output signal and the digitized baseband return signal for use in calculating altitude measurements of the aircraft or Doppler measurements for determining speed measurements of the aircraft. To illustrate, the RF unit 102 can receive the bit stream from the surface-mountable antenna module 104 and analyze the bit stream to extract data representing the output RF signal associated with the output RF waveform prior to transmission at the antenna and data representing the return RF signal received by the antenna based on transmission of the output RF signal. The RF unit 102 can analyze this data to generate an altitude indication for the aircraft by measuring the delay between the transmitted and received signals. For example, the RF unit 102 can calculate a difference in time based on a cross-correlation associated with the output RF signal and the return RF signal in order to estimate the time delay between the transmitted and received signals which, when multiplied by the speed of light divided by two, yields an altitude measurement for the aircraft. In a similar manner, the digitized output RF signal and the digitized return RF signal can be compared to determine a relative Doppler shift between the output RF signal and the return RF signal. The relative Doppler shift is a function of the speed of the vehicle over the ground, referred to as the ground speed of the vehicle.

As another example, the RF unit 102 can deserialize the bit stream to extract the data representing the output RF signal and the data representing the return RF signal to compare the two data for generating an RF output discrepancy metric. If the output discrepancy metric exceeds an RF output discrepancy threshold, the RF unit 102 can generate an RF output discrepancy indication that indicates that there is a potential error condition associated with the altimeter measurements. Additionally, if the radio device 100 is configured to perform Doppler-based measurements, the RF unit 102 can analyze additional values of the bit stream to generate a speed indication for the aircraft, as further described herein with reference to FIG. 5. The RF unit 102 can provide the indicators and/or the measurement data (e.g., the altitude measurement data or the speed measurement data) to an INS or IRS for use in location determination and navigation in situations in which a GPS-based navigation system is experiencing a GPS-denied status, or to supplement measurements derived from GPS data.

Additionally, or alternatively, the RF unit 102 can provide the measurement data, information derived from the measurement data, the altitude indication, the speed indication, or a combination thereof, to one or more visual displays of the aircraft. As an example, the radio device 100 can be coupled to a navigational display that is configured to display an altitude reading and/or a ground speed based on the bit stream received by the RF unit 102 from the surface-mountable antenna module 104. In some examples, the return RF signal is a reflection of the output RF signal from the ground that is received by the antenna, and the altitude reading can be calculated based on a time difference between the digitized output RF signal and the digitized return RF signal. The altitude reading can be displayed by the navigational display or a different altitude indicator. Additionally, or alternatively, the altitude reading can be provided to a variety of other aircraft systems including, but not limited to, an automatic flight control system, a ground proximity warning system, a braking control system, a flight management system, an inertial system, and GPS receiver(s) on the aircraft.

As another example, the radio device 100 can be coupled to a ground speed indicator, such as the navigational display, that is configured to display a ground speed of the aircraft based on the bit stream received by the RF unit 102 from the surface-mountable antenna module 104. In this example, multiple Doppler radar signals can be transmitted as output RF signals (such as a port front beam/signal, a starboard front beam/signal, a port back beam/signal, and a starboard back beam/signal) by the antenna of the surface-mountable antenna module 104, and the respective reflections of the output RF signals can be received as returned RF signals by the antenna of the surface-mountable antenna module 104. The beam/signal arrangement discussed here is an example, and in other implementations, other beam/signal configurations are possible such as, for example, a configuration with a forward beam/signal, a right beam/signal, a rear beam/signal, and a left beam/signal. The Doppler shift (e.g., the change in frequency) caused by the Doppler effect can be calculated based on a comparison of the frequency of the digitized output RF signals and the digitized return RF signals, and the ground speed of the aircraft can be calculated based on the observed Doppler shift taking into account the geometry of the antenna beams for use in displaying the ground speed, such as via the navigational display or a different ground speed indicator. Additionally, or alternatively, the ground speed can be provided to a variety of other aircraft systems including, but not limited to, an automatic flight control system, a ground proximity warning system, a braking control system, a flight management system, an inertial system, and GPS receiver(s) on the aircraft, similar to as described above for the altitude reading.

In this manner, the RF unit 102 can be designated to generate output signals for the surface-mountable antenna module 104 in addition to demodulating and deserializing received bit streams from the surface-mountable antenna module 104 to generate measurement data, and the surface-mountable antenna module 104 can be designated to perform RF processing, beamforming, and analog-to-digital (A/D) conversion of RF signals. By locating the RF processing and A/D conversion at the surface-mountable antenna module 104, the radio device 100 enables digitization of the RF signals at the surface-mountable antenna module 104 instead of at the RF unit 102, as compared to the typical radio altimeter 110. Because both the transmit and receive signals are already digitized before being communicated via the RF cable 106, the length of the RF cable 106 does not change the relative delay/Doppler of the signals and therefore does not affect the calculations performed to generate the measurement data, and thus the length of the RF cable 106 does not affect the accuracy or integrity of the measurements. In addition, confidence in the readings of the radio device 100 is improved as compared to readings of the typical radio altimeter 110. To illustrate, because received RF signals are processed and digitized in the receiver/transmitter unit 112 of the typical radio altimeter 110, leakage from connectors between the receiver/transmitter unit 112 and the RF cables 118, 120 or connectors between the antennas 114, 116 and the RF cables 118, 120 can cause loss of RF signals, resulting in potential inaccuracy of measurements generated by the typical radio altimeter 110. Unlike the typical radio altimeter 110, the radio device 100 of the present disclosure digitizes RF signals at the surface-mountable antenna module 104, such that leakage in RF connectors cannot cause inaccuracies in the measurements generated by the radio device 100, thereby improving confidence in the altitude and ground speed readings from the radio device 100.

Additionally, because the processing of the signals is agnostic to the length of the RF cable 106, the length of the RF cable 106 is not constrained to be one of a set of predetermined lengths. This increases the locations on the surface of the aircraft that the surface-mountable antenna module 104 can be mounted, which increases the utility of the surface-mountable antenna module 104 with respect to use on different models of aircraft. Also, the length of the RF cable 106 can be selected based on the distance between the RF unit 102 and the surface-mountable antenna module 104 without having to account for excess cable if the distance is less than the closest predetermined length from a set of fixed lengths, which eliminates the storage area needed to spool or coil overly long portions of RF cables as compared to aircraft which use the typical radio altimeter 110.

Additionally, the surface-mountable antenna module 104 can be designed to have the same form factor as the transmit antenna 114 (or the receive antenna 116) of a conventional system, such as one that conforms to the ARINC 707 standard, thereby lowering the cost and complexity of replacing the typical radio altimeter 110 with the radio device 100 during a retrofit, such as an overnight retrofit. Additionally, as further described herein, the surface-mountable antenna module 104 can include an antenna array and beamformer that enables performance of both altitude measurements and Doppler-based speed measurements using a single component, and the antenna array can be configured to transmit OFDM-modulated RF waveforms, DSSS-modulated RF waveforms, or a combination thereof, with pseudo-random noise at particular frequencies to reduce interference from other wireless communication technologies, to make use of dedicated frequency resources for aircraft navigation (such as those allocated to the ARNS), and to reduce or eliminate the possibility of the RF waveforms transmitted by the radio device 100 being jammed or spoofed by malicious entities.

Figure 2:
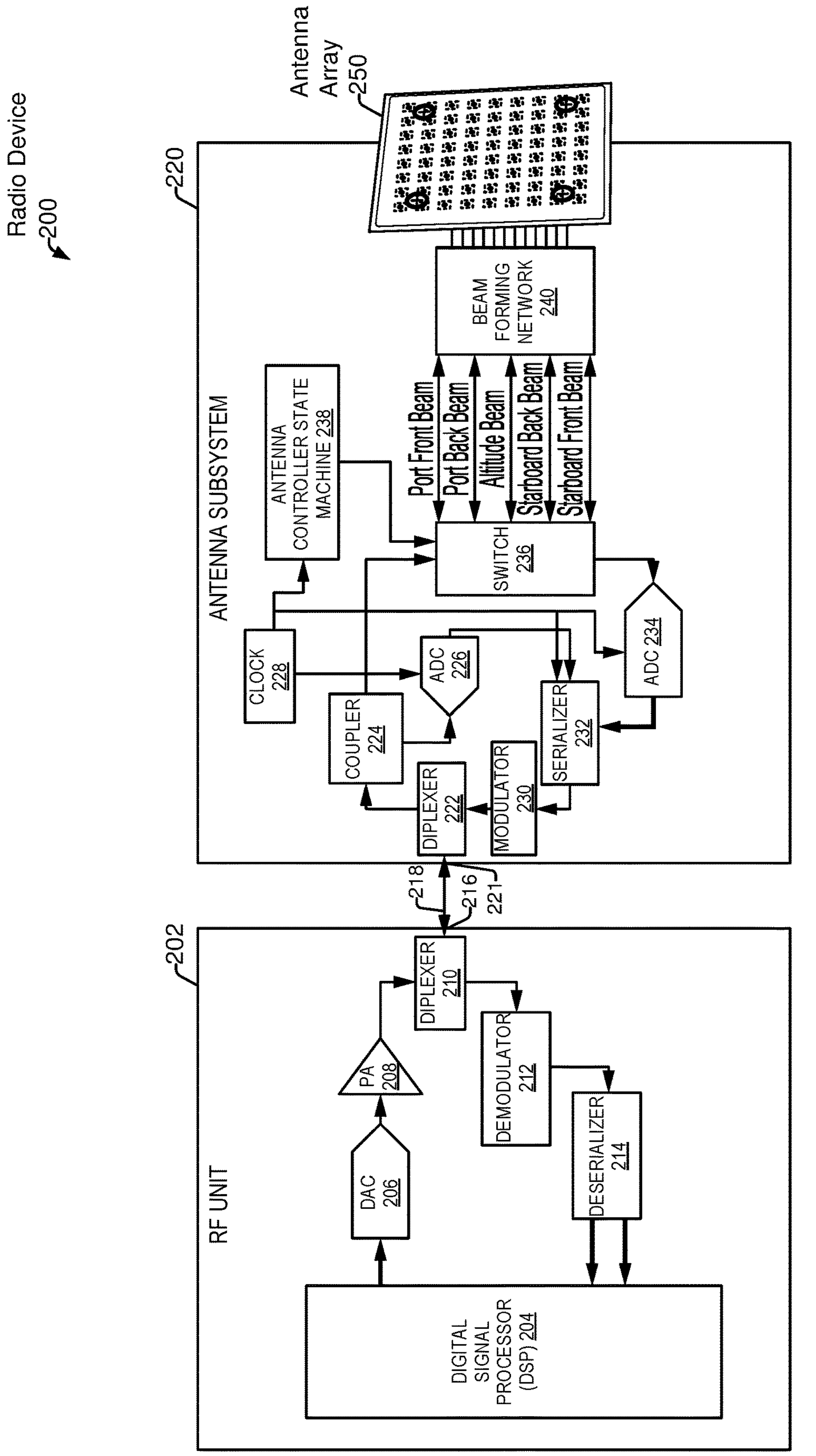
FIG. 2 is a block diagram of a particular implementation of a radio device that combines radio altimeter and Doppler radar functionality and that includes a surface-mountable antenna module according to one or more aspects of the present disclosure.

FIG. 2 depicts a particular implementation of a radio device 200 that combines radio altimeter and Doppler radar functionality and that includes a surface-mountable antenna module according to one or more aspects of the present disclosure. In some implementations, the radio device 200 of FIG. 2 can include or correspond to the radio device 100 of FIG. 1. In the implementation shown in FIG. 2, the radio device 200 includes an RF unit 202 coupled to an antenna subsystem 220 by an RF cable 218. In some implementations, the RF unit 202 includes or corresponds to an LRU or another component inside of a vehicle (e.g., an aircraft), the RF cable 218 is a coaxial cable that is ARINC 707 compliant, and the antenna subsystem includes or corresponds to components within a housing that is mounted to a surface, such as a bottom surface, of the aircraft in a different location than the RF unit 202.

The RF unit 202 includes a digital signal processor (DSP) 204, a digital-to-analog converter (DAC) 206, a power amplifier (PA) 208, a diplexer 210, a demodulator 212, a deserializer 214, and a first electrical connector 216. The DSP 204 is coupled to the DAC 206 and the deserializer 214. The DAC 206 is coupled to the DSP 204 and the PA 208. The PA 208 is coupled to the DAC 206 and the diplexer 210. The diplexer 210 is coupled to the PA 208, the first electrical connector 216, and the demodulator 212. The demodulator 212 is coupled to the diplexer 210 and the deserializer 214. The deserializer 214 is coupled to the demodulator 212 and the DSP 204. The antenna subsystem 220 (e.g., a surface-mountable antenna module) includes a second electrical connector 221, a diplexer 222, a directional coupler 224, an analog-to-digital converter (ADC) 226, a clock 228, a modulator 230, a serializer 232, an ADC 234, a switch 236, an antenna controller state machine 238, a beam forming network 240, and an antenna array 250. Although described as a state machine, in other implementations, the antenna controller state machine 238 may be a generalized processor or controller of any type, such as a microprocessor or microcontroller, as non-limiting examples. The diplexer 222 is coupled to the second electrical connector 221, the directional coupler 224, and the modulator 230. The directional coupler 224 is coupled to the diplexer 222, the ADC 226, and the switch 236. The ADC 226 is coupled to the clock 228, the serializer 232, and the directional coupler 224. The clock 228 is coupled to the ADC 226, the ADC 234, the serializer 232, and the antenna controller state machine 238. The serializer 232 is coupled to the modulator 230, the ADC 234, the ADC 226, and the clock 228. The ADC 234 is coupled to the clock 228, the switch 236, and the serializer 232. The switch 236 is coupled to the directional coupler 224, the ADC 234, and the antenna controller state machine 238. The beamforming network 240 coupled to the switch 236 and the antenna array 250.

The first electrical connector 216 can be coupled to the second electrical connector 221 via the RF cable 218. In some implementations, the first electrical connector 216 and the second electrical connector 221 are coaxial connectors. Additionally, or alternatively, the first electrical connector 216 can be configured to receive power for the DAC 206, the PA 208, the demodulator 212, the deserializer 214, or a combination thereof, and the second electrical connector 221 can be configured to receive power for the ADC 226, the ADC 234, the serializer 232, the modulator 230, the antenna controller state machine 238, the switch 236, the beamforming network 240, or a combination thereof.

Although FIG. 2 illustrates the RF unit 202 and the antenna subsystem 220 as including particular individual components, in other implementations the described functionality of two or more of the components of the RF unit 202 or the antenna subsystem 220 can be performed by a single component. For example, the ADC 226 and the ADC 234 can be replaced with a single ADC, and the switch 236 can be replaced with a hybrid switch that is capable of providing a signal to the beamforming network 240 as output or to the ADC as output (i.e., to pass the output RF signal for digitization) as well as receiving a signal from the beamforming network 240 and providing the signal as output to the ADC. Additionally, or alternatively, at least some of the DSP 204, the DAC 206, the PA 208, the diplexer 210, the demodulator 212, the deserializer 214, the diplexer 222, the directional coupler 224, the ADC 226, the clock 228, the modulator 230, the serializer 232, the ADC 234, the switch 236, the antenna controller state machine 238, and the beamforming network 240 can be represented in hardware, such as via an application-specific integrated circuit (ASIC) or a field-programmable gate array (FPGA), or the operations described with reference to some of the elements can be performed by a processor executing computer-readable instructions. For brevity, any combination of the DAC 206, the PA 208, the diplexer 210, the demodulator 212, the deserializer 214, the diplexer 222, the directional coupler 224, the ADC 226, the clock 228, the modulator 230, the serializer 232, the ADC 234, the switch 236, the antenna controller state machine 238, and the beamforming network 240 can be referred to herein as circuitry.

During operation of the radio device 200, the RF unit 202 can be configured to generate output RF signals for transmission as output RF waveforms by the antenna array 250 under control of the antenna subsystem 220, and to receive digitized representations of RF signals from the antenna subsystem 220 for processing to generate altitude indicators, altitude measurements, speed indicators, speed measurements, other measurements or indicators, or a combination thereof. To illustrate, the DSP 204 can be configured to generate an output signal (e.g., a transmit (TX) signal) for transmission by the antenna subsystem 220. In some implementations, the DSP 204 generates the output signal based on a condition of the vehicle, such as a GPS-denied condition, an automatic or manual request, an uncertainty rating associated with a GPS-based navigation system falling below a threshold, or some other trigger condition. The DAC 206 can be configured to perform digital-to-analog conversion on the output signal (e.g., a digitized signal) to generate an output RF signal (e.g., an analog signal) that can be amplified by the PA 208 and passed through the diplexer 210 to the first electrical connector 216 for communication to the antenna subsystem 220 via the RF cable 218.

The second electrical connector 221 can be configured to receive the output RF signal and to provide the output RF signal to the diplexer 222 for passing to the directional coupler 224. The ADC 226 can generate a digitized RF signal representing the output RF signal using a clock signal from the clock 228, and the digitized RF signal can be provided to the serializer 232. The directional coupler 224 can also provide the output RF signal to the switch 236, and the switch 236 can be configured to manage inputs and outputs from the beamforming network 240 based on one or more control signals from the antenna controller state machine 238. The antenna controller state machine 238 can be configured to determine a state of the antenna subsystem 220 based on a clock signal from the clock 228, the previous state, and a state diagram or configuration, and each operating state can be associated with the output of various control signals to the switch 236. For example, the antenna controller state machine 238 can be configured to determine a beam (e.g., based on a selected RF signal) of a plurality of beams to be output by the beamforming network 240.

For example, the antenna controller state machine 238 can determine whether a current state is an altitude transmit state, one or more Doppler transmit states, an altitude receive state, one or more Doppler receive states, other states, or a combination thereof, and based on the current state, the antenna controller state machine 238 can provide appropriate control signaling to the switch 236 to facilitate operations associated with the current state. As an example, if the antenna controller state machine 238 determines that the current state is an altitude transmit state, the antenna controller state machine 238 can provide control signaling to the switch 236 to cause the switch 236 to provide the output RF signal to the beamforming network 240 as an altitude transmit beam input. As another example, if the antenna controller state machine 238 determines that the current state is a Doppler transmit state (e.g., one of multiple Doppler transmit states), the antenna controller state machine 238 can provide control signaling to the switch 236 to cause the switch 236 to provide the output signal as a particular Doppler transmit beam.

The Doppler transmit beam can depend on the configuration of the antenna array 250. In some implementations, the antenna array 250 can be configured to transmit four different beams for performing Doppler-based measurements with respect to a relative location of the aircraft: a port front beam, a port back beam, a starboard back beam, and a starboard front beam, as further described with reference to FIG. 5. In other implementations, the antenna array 250 can be configured to transmit more than four or fewer than four beams for performing Doppler-based measurements, and the beams can be located in other relative positions of the antenna array 250 or have other configurations.

Figure 4:
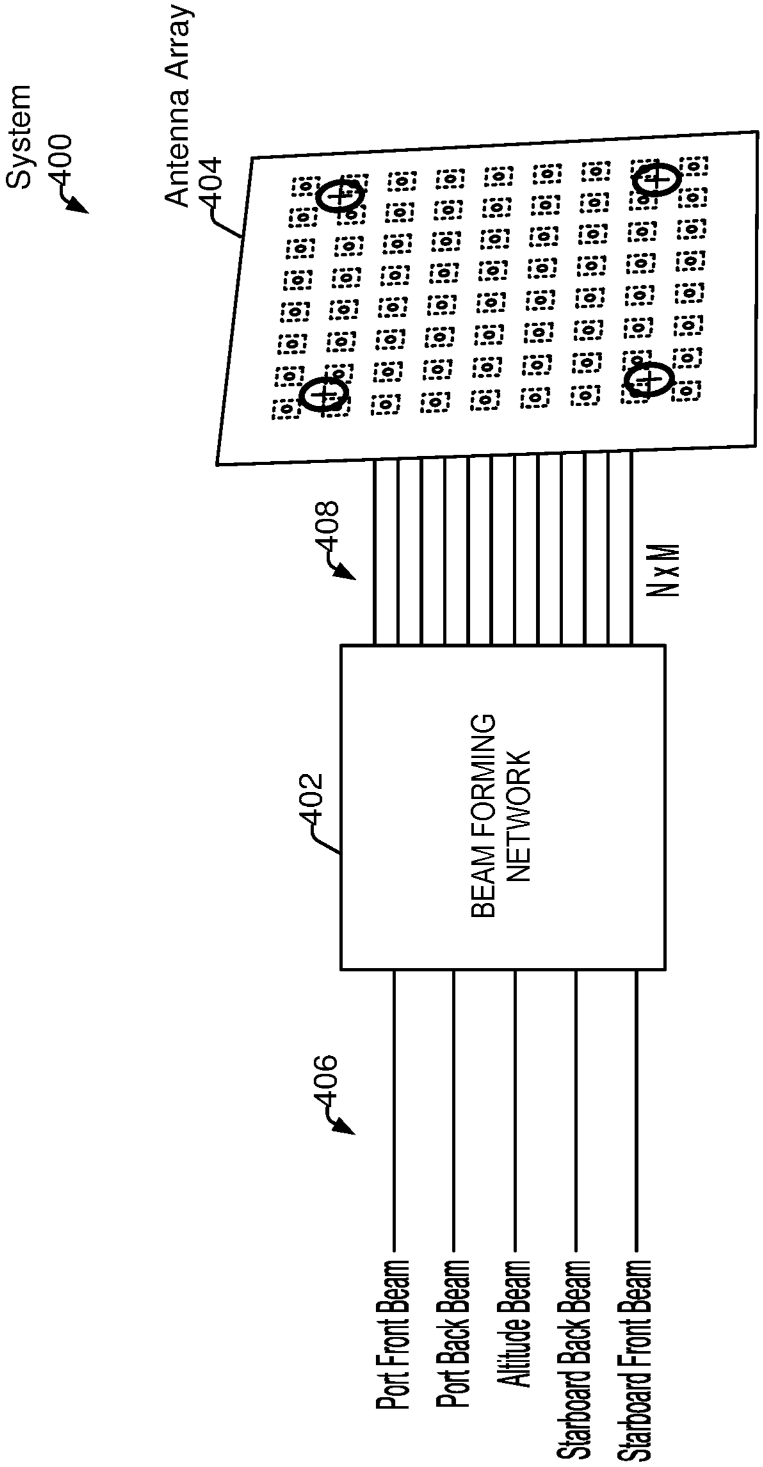
FIG. 4 is a diagram that illustrates an example of a system for beamforming via a surface-mountable antenna array of a radio device according to one or more aspects of the present disclosure.

The beamforming network 240 can receive the output RF signal from the switch 236 (with an indication of which type of beam is to be transmitted), and optionally to receive other output RF signals to be transmitted, and the beamforming network 240 can perform beamforming to generate one or more output RF waveforms for transmission via the beamforming network 240, as further described herein with reference to FIG. 4. The beamforming can be performed based on a preconfigured RF network or an active switching network, such that the beamforming network 240 produces a set of beams for transmission and reception via the antenna array 250.

After transmitting the one or more output RF waveforms, the antenna array 250 can receive one or more return RF waveforms as a result of the transmissions. For example, a return RF waveform can be a reflection of the altitude transmit beam or the one or more Doppler transmit beams, and thus be referred to as an altitude receive beam signal or a Doppler receive beam signal. The antenna controller state machine 238 can be configured to, based on a determination of the current state of the antenna subsystem, send control signaling to the switch 236 to provide an RF signal on one of the lines from the beamforming network 240 as an input to the ADC 234. For example, if the antenna controller state machine 238 determines that the current state is an altitude receive state, the antenna controller state machine 238 can provide control signaling to the switch 236 to cause the switch 236 to provide the return RF signal to the ADC 234 as an altitude receive RF signal. The ADC 234 can convert the altitude receive RF signal to a digitized signal that can be provided to the serializer 232 for serializing with the altitude output RF signal (e.g., the signal before transmission via the antenna array 250) and modulation by the modulator 230 to generate a portion of a bit stream. Alternatively, if the antenna controller state machine 238 determines that the current state is one of one or more Doppler receive states, the antenna controller state machine 238 can provide control signaling to the switch 236 to cause the switch 236 to provide the return RF signal to the ADC 234 as a Doppler receive RF signal, such as a port front receive RF signal, a port back receive RF signal, a starboard back receive RF signal, or a starboard front receive RF signal, as non-limiting examples. In some examples, regardless of whether performing radio altimeter functionality or Doppler radar functionality, the receive RF signal and the output RF signal are down-converted to baseband and sampled at a particular sampling rate by the ADC 234 to generate the digitized signals, which represent digitized samples of the in-phase and quadrature (I and Q) components of the respective RF signals.

The ADC 234 can convert the Doppler receive RF signal to a digitized signal that can be provided to the serializer 232 for serializing with the respective Doppler output RF signal (e.g., the respective signal before transmission via the antenna array 250) and modulation by the modulator 230 to generate a portion of the bit stream. The bit stream can pass through the diplexer 222, and the second electrical connector 221 can be configured to communicate the bit stream to the RF unit 202 via the RF cable 218. Because the bit stream has already been digitized before being communicated via the electrical connectors 216, 221 and the RF cable 218, any faults associated with the electrical connectors 216, 221 or the RF cable 218 will affect whether the data is communicated, but will not affect the accuracy or integrity of the measurements represented by the data, as is possible in conventional radio altimeters that communicate analog return signals through electrical connections and cables.

The first electrical connector 216 can receive the bit stream from the antenna subsystem 220 via the RF cable 218, which is passed through the diplexer 210 upon reception. The demodulator 212 can be configured to demodulate the bit stream to generate a demodulated bit stream, and the deserializer 214 can be configured to deserialize the demodulated bit stream to obtain a digitized output signal and a digitized return signal (e.g., digitized data that represents the RF output signal prior to transmission by the antenna array 250 and the RF return signal received by the antenna array 250). For example, the RF output signal can include or correspond to the altitude transmit RF signal and the RF return signal can include or correspond to the altitude receive RF signal. As another example, the RF output signal can include or correspond to a Doppler transmit RF signal, such as the port front transmit RF signal, and the RF return signal can include or correspond to a Doppler return RF signal, such as the port front receive RF signal. The DSP 204 can receive the deserialized digitized representations of the RF signals and can analyze the digitized representations (e.g., derived from portions of the bit stream) to determine an altitude indicator or altitude measurement, a speed indicator or speed measurement, other information, or a combination thereof, as described above with reference to FIG. 1.

In some implementations, the radio device 200 can be configured to generate output RF waveforms, via the antenna array 250, that are configured to prevent, or reduce the likelihood of, jamming or spoofing of signals transmitted by the antenna array 250. For example, the RF unit 202 can cause the antenna subsystem 220 to transmit signals and receive return signals in a particular frequency range, such as approximately 13.25 GHz to 13.4 GHz, to avoid unintentional interference by other common wireless communication technologies. Alternatively, the transmit signals and return signals can be in a range from approximately 4.2 GHz to approximately 4.4 GHz, or other frequency ranges having sufficient bandwidth (e.g., >=150 MHz). As another example, the RF unit 202 can operate in a first frequency band (e.g., approximately 4.2 GHz to approximately 4.4 GHz) for performance of altimeter measurement operations and in a second frequency band (e.g., approximately 13.25 GHz to approximately 13.4 GHz) for performance of Doppler-based measurement operations. As another example, the RF unit 202 can provide output RF signals that are modulated using OFDM, and in some implementations, by configuring the output RF waveforms to include pseudo-random noise through use of DSSS or other spread spectrum techniques, which have good auto-correlation properties and support use of a low post-correlation bandwidth to support high processing gain and which can sufficiently randomize the output RF waveforms such that a malicious entity is not capable of predicting the output RF waveform in advance in order to jam or spoof performance of altimeter or Doppler-based measurement operations.

In some implementations, the RF unit 202 can generate the code sequences used to create the output RF signals pseudo-randomly. For example, the RF unit 202 may pseudo-randomly generate a watermark, such as a pseudo-randomly generated bit string, that is included in the output RF signal. In some implementations, the RF unit 202 may select the watermark from a pool of long codes, and the selection may be performed randomly or pseudo-randomly. The RF unit 202 can maintain the pseudo-random message (e.g., the watermark) for use in comparing to digitized return signals, thereby authenticating digitized return signals that include matching watermark or data messages. For example, the RF unit 202 can compare a watermark or data message included in a digitized return signal to a watermark or data message in the corresponding digitized output signal that triggered receipt of the return RF signal, and if the watermarks or data messages match, the RF unit 202 can authenticate the digitized return RF signal for use in generating altitude or ground speed measurements. However, if the watermarks do not match, the RF unit 202 can ignore the digitized return RF signal, and optionally initiate performance of one or more operations to report or otherwise deal with a possible spoofing situation, such as generating an alert.

Because the watermarks or data messages are pseudorandomly generated, a malicious entity on the ground lacks advanced knowledge of the watermark and lacks sufficient time, due to the speed of the vehicle, to decode a received RF waveform and extract the watermark or data message to insert in a spoofed RF waveform. In this manner, the radio device 200 improves security and performance, as compared to other radio altimeters or Doppler radars, without requiring cryptographic coding which can increase cost, complexity, and power consumption of the radio device 200. In some other implementations, the RF unit 202 generates a cryptographic code for inclusion in the output RF signal, if security concerns outweigh the increased cost, complexity, and power consumption associated with the cryptographic coding, and the RF unit 202 performs cryptographic decoding on the digitized return RF signal as part of the authentication process.

Figure 3:
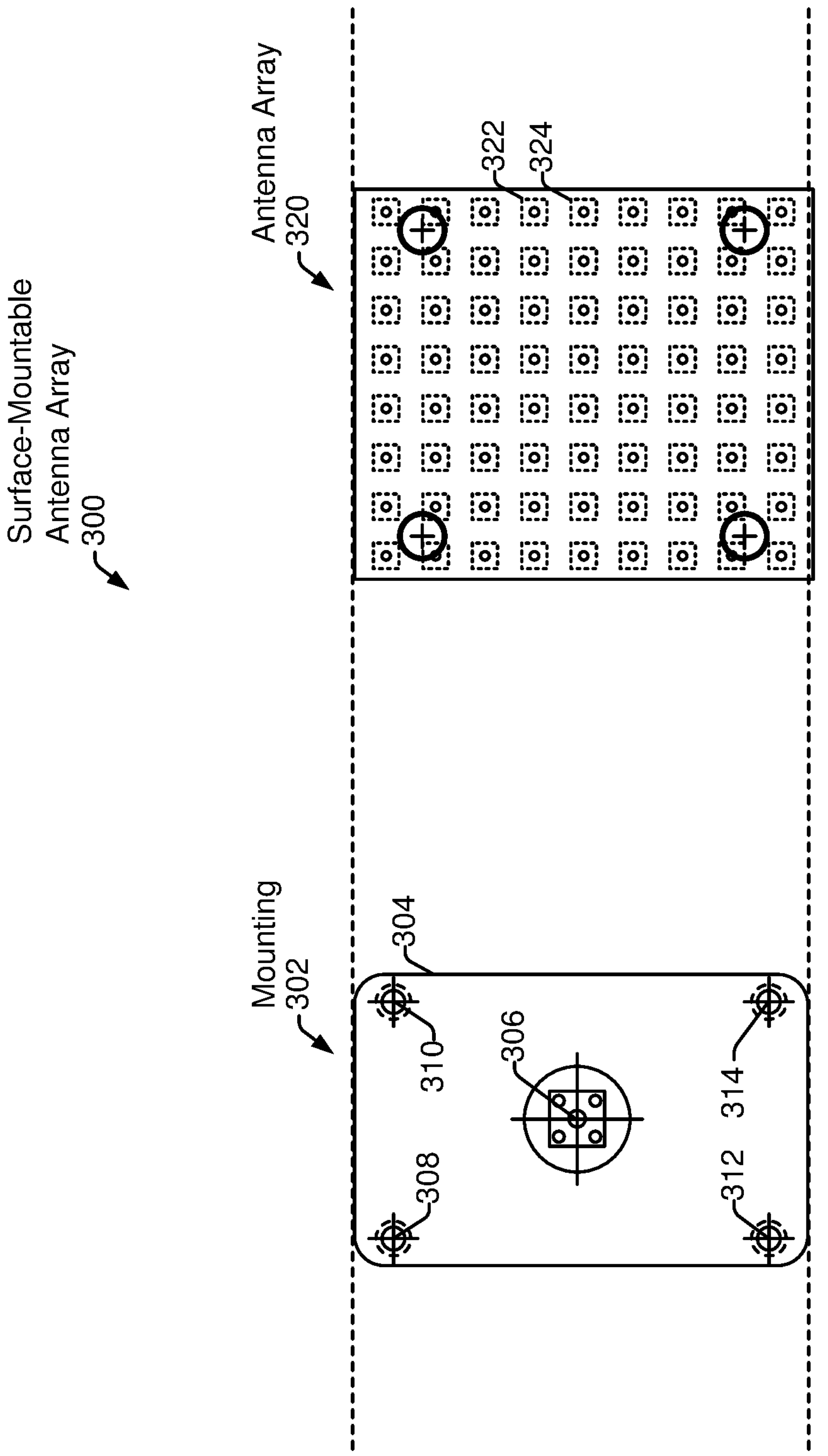
FIG. 3 is a diagram that illustrates an example of an expanded view of a surface-mountable antenna array of a radio device according to one or more aspects of the present disclosure.

FIG. 3 depicts an example of an expanded view of a surface-mountable antenna array 300 of a radio device according to one or more aspects of the present disclosure. The surface-mountable antenna array 300 can be included in a radio device that provides radio altimeter functionality, Doppler radar functionality, or a combination of radio altimeter functionality and Doppler radar functionality. In some implementations, the surface-mountable antenna array 300 of FIG. 3 can include or correspond to the surface-mountable antenna module 104 of FIG. 1 or the antenna array 250 of FIG. 2. The surface-mountable antenna array 300 depicted in FIG. 3 includes a mounting 302 and an antenna array 320 coupled to the mounting. The mounting 302 can include or correspond to a plate or other mounting surface that is configured to be mounted on a particular surface of a vehicle, such as a bottom surface of an aircraft, as further described herein with reference to FIG. 5. The mounting 302 can be affixed to the surface of the vehicle by a plate 304 and one or more screws or other fasteners. The mounting 302 can include a center 306 and one or more mounting holes (e.g., through holes), such as a first mounting hole 308, a second mounting hole 310, a third mounting hole 312, and a fourth mounting hole 314, for coupling the antenna array 320 to the mounting 302. Although four mounting holes are shown in FIG. 3, in some other implementations, there can be more than four or fewer than four mounting holes, or the mounting holes 308-314 can be omitted if the antenna array 320 is coupled to the mounting 302 using other hardware or techniques. A mounting hole pattern defined by the mounting holes 308-312 can be specified by an industry standard, such as the ARINC 707 standard.

In some implementations, the mounting 302 can have a footprint that is specified by an industry standard, such as the ARINC 707 standard. For example, a first dimension (a width in the orientation shown in FIG. 3) of the mounting 302 can be within a range between 3.5 and 3.55 inches, a second dimension (a height in the orientation shown in FIG. 3) of the mounting 302 can be within a range between 4.1 and 4.5 inches, a distance between a center of the third mounting hole 312 and a center of the fourth mounting hole 314 can be within a range between 2.73 and 2.77 inches, a distance between the left side (in the orientation shown in FIG. 3) of the mounting 302 and the center 306 can be within a range between 1.745 and 1.775 inches, a distance between the center of the third mounting hole 312 and the center 306 can be approximately 1.375 inches, a distance between the top (in the orientation shown in FIG. 3) and the bottom (in the orientation shown in FIG. 3) of the mounting 302 can be within a range between 4.1 and 4.15 inches, a distance between the center of the first mounting hole 308 and the center of the third mounting hole 312 can be within a range between 2.88 and 2.92 inches, a distance between the center 306 and the bottom (in the orientation shown in FIG. 3) of the mounting 302 can be within a range between 2.035 and 2.065 inches, and a distance between the center 306 and the center of the third mounting hole 312 can be approximately 1.375 inches.

The antenna array 320 can be coupled to the mounting 302. It is noted that the reference points are depicted on the antenna array 320 to indicate location of the mounting holes 308-314, and thus the alignment of the antenna array 320, when the antenna array 320 is coupled to the mounting 302. The antenna array 320 includes a plurality of antenna patches that are arranged in rows and columns with respect to the orientation shown in FIG. 3. Each antenna patch can have a substantially square shape and include a respective antenna element of the antenna array 320. In some implementations, a first antenna patch 322 has a substantially square shape with a side having a length that is based on approximately one-fourth of a wavelength of the return RF signal. In some such implementations, a second antenna patch 324 is substantially identical to the first antenna patch 322, and the second antenna patch 324 can be positioned a distance that is based on approximately one-half of the wavelength of the return RF signal from the first antenna patch 322. In some implementations, the antenna array 320 is configured to have a surface area selected such that the surface-mountable antenna array 300 is compatible with an ARINC 707 standard radio altimeter footprint. For example, the antenna array 320 can include nine rows and eight columns of antenna patches having the above-described dimensions.

In some other implementations, the surface area of the antenna array 320 can be larger or smaller than is compatible with the ARINC 707 standard radio altimeter footprint if the mounting hole pattern defined by the mounting holes 308-314 is compatible with the ARINC 707 standard. As an illustrative example, the antenna array 320 can include fourteen rows and thirteen columns of antenna patches having the above-described dimensions, and the surface area can be one inch larger on each side than the ARINC 707 compliant footprint, which can increase the beamforming and signaling capabilities of the antenna array 320 without significantly increasing the cost and complexity of replacing existing radio altimeters with radio devices having the surface-mountable antenna array 300 that has the mounting hole pattern defined by the mounting holes 308-314. In such an example, the surface-mountable antenna array 300 would be capable of generating more focused antenna beams which can provide more accurate height measurements, speed measurements, or a combination thereof, and an RF gasket or other adapter device may be utilized to enable replacement of a conventional antenna with the surface-mountable antenna array 300.

FIG. 4 depicts an example of a system 400 for beamforming via a surface-mountable antenna array of a radio device according to one or more aspects of the present disclosure. The system 400 can be included in or utilized by a radio device that provides radio altimeter functionality, Doppler radar functionality, or a combination of radio altimeter functionality and Doppler radar functionality In some implementations, the system 400 of FIG. 4 can be included in or correspond to the surface-mountable antenna module 104 of FIG. 1, the antenna subsystem 220 of FIG. 2, or the surface-mountable antenna array 300 of FIG. 3. The system 400 includes a beamforming network 402 and an antenna array 404. The beamforming network 402 is configured to receive RF signals via a plurality of inputs 406 and to perform beamforming on the RF signals to generate beam signals that are output via a plurality of outputs 408 to the antenna array 404 for transmission as one or more antenna beams that form output RF waveforms. In some implementations, the system 400 can be used to perform altimeter and Doppler-based radar operations, and the antenna array 404 can include a 9×8 antenna array, as described above with reference to FIG. 3. In some such implementations, the plurality of inputs can include an altitude beam, a port front beam, a port back beam, a starboard back beam, and a starboard front beam, and the plurality of outputs can include outputs sufficient for a 9×8 antenna array (e.g., an antenna array having nine rows and eight columns of antenna patches).

In some other implementations, the inputs can include inputs for other beam arrangements, such as a front beam, a rear beam, a right beam, and a left beam, as a non-limiting example. Other beam arrangements are possible, as well as beams being directed to the ground at different angles. Beam angle and geometry can affect the accuracy of altitude and/or ground speed measurements, and as such, beam angle and beam geometry can be selected to provide beam geometries associated with target accuracy levels. Additionally, or alternatively, the antenna array 404 can be an N×M antenna array, where N is more or less than nine, M is more or less than eight, or both, and/or the plurality of inputs 406 can include or correspond to less than five or more than five inputs, which can include different inputs than one altitude beam and four Doppler-based beams.

The beamforming network 402 (e.g., a beamformer) can be configured to form a plurality of beams to be transmit and/or received by the antenna array 404 according to a beamforming pattern. In some implementations, the beamforming pattern is a preconfigured beamforming network configuration, which can also be referred to as performing passive beamforming or beamforming using a preconfigured beamforming network. For example, the preconfigured beamforming network configuration can be established according to a two-dimensional Butler matrix. In this example, the Butler matrix is a beamforming network configuration that can be constructed from passive devices, such as directional couplers and phase shifters, that controls the direction of a plurality of RF beams at the antenna array 404. For example, five fixed beams (e.g., an altitude beam and four Doppler-based beams) can be sequenced by an RF unit and provided to the beamforming network 402 to sequentially output five RF waveforms via various antenna ports of the antenna array 404 in fixed directions. Similar sequencing and beamforming can occur for five RF return waveforms at the antenna array 404. In other examples, the preconfigured beamforming network configuration can be any fixed set of weightings and time delays, or phasings, that enable a combination of signals to be sent from or received by sensors in the antenna array 404 or that otherwise cause transmission or reception of a known, arbitrary beam configuration.

In some other implementations, the beamforming pattern corresponds to an active beamforming network, which can be referred to as performing active beamforming or beamforming using an active beamforming network. This type of beamforming pattern enables the beamforming network 402 to actively modify phase and amplitude parameters to form desired beams one at a time. For example, the beamforming weights (or other configuration) can be adapted or adjusted based on one or more parameters associated with the vehicle, in order to improve the coverage and/or beam angle performance of the antenna array 404. As non-limiting examples, the beamforming pattern that corresponds to the active beamforming network can be based on an altitude of the vehicle, a speed of a vehicle, an attitude of the vehicle, a GPS-denied status of the vehicle, a physical configuration of the antenna array 404, other parameters, or a combination thereof. As an example, the beam angles associated with the Doppler-based beams can be modified based on the altitude of the vehicle, such as to reduce a length of the Doppler-based beams to the ground below the vehicle. As another example, a beamforming pattern can be switched to an active beamforming network configuration based on detection of a GPS-denied status of the vehicle. The active beamforming network configuration can include or correspond to use of a multiple signal classification (MUSIC) algorithm or an iterative sparse asymptotic minimum variance (SAMV) algorithm, or other active beamforming algorithms.

Figure 5:
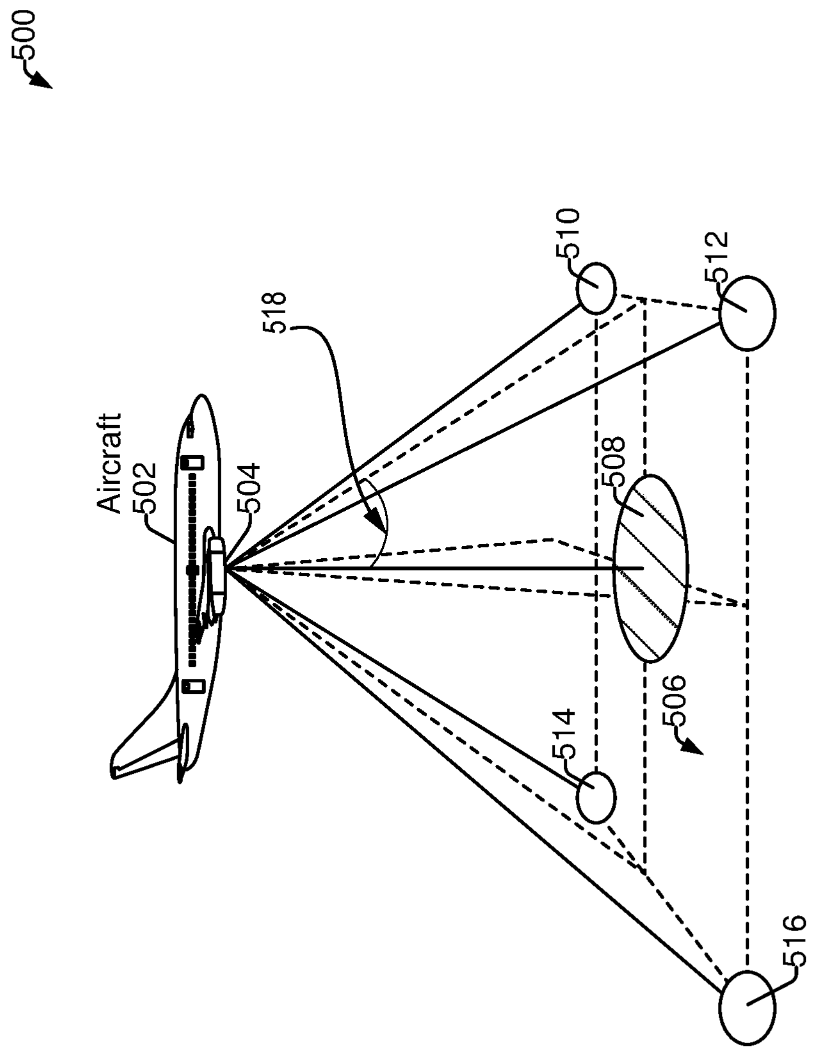
FIG. 5 is a diagram that illustrates an example of an aircraft using a radio device that includes a surface-mountable antenna array according to one or more aspects of the present disclosure.

FIG. 5 depicts an example 500 of an aircraft 502 that uses a radio device that includes a surface-mountable antenna array 504 according to one or more aspects of the present disclosure. The surface-mountable antenna array 504 can be included in a radio device that provides radio altimeter functionality, Doppler radar functionality, or a combination of radio altimeter functionality and Doppler radar functionality. In some implementations, the surface-mountable antenna array 504 includes or corresponds to the surface-mountable antenna module 104 of FIG. 1, the antenna subsystem 220 of FIG. 2, the surface-mountable antenna array 300 of FIG. 3, or the system 400 of FIG. 4. FIG. 5 depicts the aircraft 502 during a typical portion of a flight, such that the aircraft 502 is located above ground 506 in the illustrated orientation. As shown in FIG. 5, the surface-mountable antenna array 504 can be coupled to a bottom surface of the aircraft 502, such that the surface-mountable antenna array 504 is located on the surface of the aircraft 502 that is closest to the ground 506 during a substantial portion of the flight. In some other implementations, the surface-mountable antenna array 504 can be coupled to a nose of the aircraft, a side surface of the aircraft 502, or to another location.

In the example 500 shown in FIG. 5, the surface-mountable antenna array 504 can transmit a plurality of output RF waveforms as beams toward the ground 506. For example, the plurality of beams can include an altitude beam 508, a port front beam 510, a starboard front beam 512, a port back beam 514, and a starboard back beam 516. The beam arrangement shown in FIG. 5 is illustrative, and other implementations can use other beam arrangements or configurations. In some implementations, the altitude beam 508 is configured to be directed below the aircraft 502, such as at a substantially 90-degree angle. The port front beam 510 and the port starboard beam 512 can be directed forward from the altitude beam 508, with respect to the aircraft 502, and with each of the beams directed toward one of the port side or the starboard side of the aircraft 502. Similarly, the port back beam 514 and the starboard back beam 516 can be directed backward from the altitude beam 508, with respect to the aircraft 502, and with each of the beams directed toward one of the port side or the starboard side of the aircraft 502. The port front beam 510 and the starboard front beam 512 can be directed forward with respect to the altitude beam 508 at an angle of beam depression 518, and the port back beam 514 and the starboard back beam 516 can be directed backward with respect to the altitude beam 508 by the same angle of beam depression 518. In some implementations, the angle of beam depression 518 is selected from a range of 10 degrees to 60 degrees.

The altitude beam 508 is configured to transmit an altitude output RF signal used during performance of an altitude measurement operation (e.g., an altimeter operation). For example, the altitude beam 508 can communicate the altitude output RF signal toward the ground 506 such that a reflection of the altitude output RF signal is received by the surface-mountable antenna array 504 as the altitude return RF signal. The other beams 510, 512, 514, and 516 are configured to transmit Doppler-based output RF signals used during performance of a Doppler-based speed measurement operation. For example, the port front beam 510 can communicate the first output RF signal toward the ground 506 such that a reflection of the first output RF signal is received by the surface-mountable antenna array 504 as a first return RF signal, the starboard front beam 512 can communicate the second output RF signal toward the ground 506 such that a reflection of the second output RF signal is received by the surface-mountable antenna array 504 as a second return RF signal, the port back beam 514 can communicate the third output RF signal toward the ground 506 such that a reflection of the third output RF signal is received by the surface-mountable antenna array 504 as a third return RF signal, the starboard back beam 516 can communicate the fourth output RF signal toward the ground 506 such that a reflection of the fourth output RF signal is received by the surface-mountable antenna array 504 as a fourth return RF signal, and these output RF signals and return RF signals can be used to determine a speed of the aircraft 502. The beams 510, 512, 514, and 516 can have a substantially similar beam area, and a beam area of the altitude beam 508 can be substantially the same or different from the beam area of the beams 510, 512, 514, and 516. In some implementations, the beam width of the altitude beam 508 is larger, such as two to three times larger, than the beam width of the beams 510, 512, 514, and 516 to accommodate a bank angle of the aircraft 502, such as a +/−twenty-degree bank angle, as a non-limiting example. Additionally, narrower beams for Doppler-based measurements can prevent “smearing” (e.g., variation in frequency of return signals due to differences in the areas that are targeted by the beams).

Figure 6:
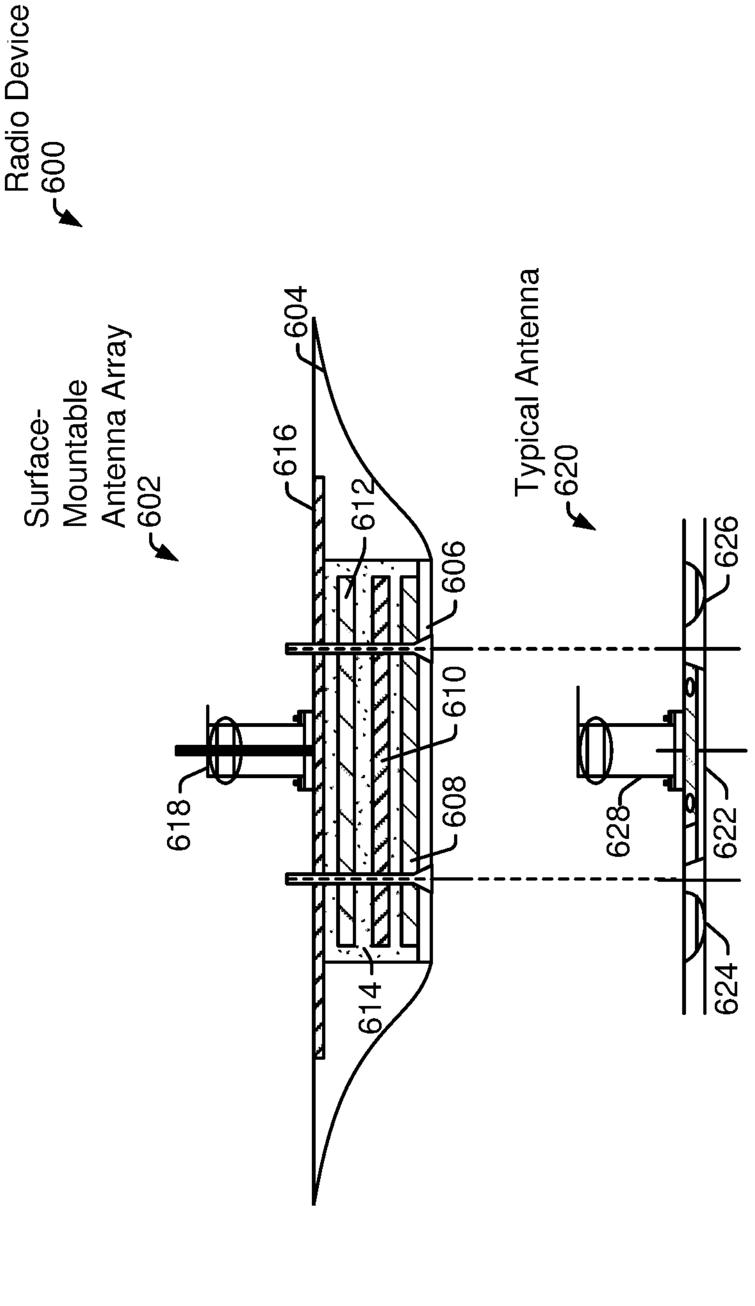
FIG. 6 is a diagram that depicts a cross-section of aspects of a radio device that includes a surface-mountable antenna array according to one or more aspects of the present disclosure.

FIG. 6 depicts a cross-section of aspects of a radio device 600 that includes a surface-mountable antenna array according to one or more aspects of the present disclosure. The radio device 600 can provide radio altimeter functionality, Doppler radar functionality, or a combination of radio altimeter functionality and Doppler radar functionality. In some implementations, the radio device 600 of FIG. 6 can include or correspond to the radio device 100 of FIG. 1, the radio device 200 of FIG. 2, a radio device that includes the surface-mountable antenna array 300 of FIG. 3, a radio device that includes the system 400 of FIG. 4, the radio device used by the aircraft 502 of FIG. 5, or a combination thereof.

The radio device 600 includes a surface-mountable antenna array 602 that is configured to be coupled to, or mounted upon, a surface of a vehicle, such as the bottom surface of an aircraft. In the example shown in FIG. 6, the surface-mountable antenna array 602 includes a housing 604 that encloses a layer stack that is configured to operate as an antenna module or antenna subsystem. The housing 604 can be coupled to the surface of an aircraft or other vehicle via one or more mounting holes (e.g., through holes), as described above with reference to FIG. 3. In some implementations, the housing 604 includes or corresponds to, or is shaped as, an airfoil that can reduce drag to an aircraft to which the surface-mountable antenna array 602 is coupled. The layer stack can include multiple layers that are stacked between a radome material layer 606 (e.g., a bottom layer in the orientation shown in FIG. 6, which can be a part of a wall of the housing 604) and a mounting layer 616 (e.g., a top layer in the orientation shown in FIG. 6). The radome material layer 606 can include any material that is capable of protecting the other layers from weather and damage, in addition to being permissive to the passage of RF waves. The mounting layer 616 can include a material that acts as a wall of the housing 604 and that is configured to be coupled to the surface of the vehicle, such as a metal or a metal alloy.

The multiple layers between the radome material layer 606 and the mounting layer 616 can include an antenna array 608, a beamforming network 610, and a circuitry layer 612. In some implementations, the antenna array 608, the beamforming network 610, and the circuitry layer 612 are located within a hermetically sealed compartment 614 between the radome material layer 606 and the mounting layer 616.

The antenna array 608 can include multiple antenna patches arranged in rows and columns, as described above with reference to FIGS. 3-4. The beamforming network 610 can be configured to apply beamforming weights and otherwise enable generation of selected antenna beams, according to a beamforming network configuration, as described above with reference to FIGS. 2 and 4. The circuitry layer 612 can include circuitry configured to perform some RF processing, as well as analog-to-digital conversion, serialization, and modulation, as described above with reference to FIGS. 1-2. The surface-mountable antenna array 602 can also include an electrical connector 618 that is configured to connect to an RF cable, such as a coaxial cable, that is coupled to the surface-mountable antenna array 602 and to an RF unit of the radio device 600. In addition to enabling communication of digitized and serialized signals to the RF unit, via the RF cable, the electrical connector 618 can be configured to receive DC power for the surface-mountable antenna array 602, such as via a center conductor.

FIG. 6 also depicts a cross-section of an example of a typical radio altimeter antenna 620, such as a radio altimeter that is replaced with the surface-mountable antenna array 602 of a combined radio altimeter/Doppler radar device during a retrofit operation. The typical radio altimeter antenna 620 includes an antenna array 622 that is mounted to a surface of an aircraft, a transmitter 624, a receiver 626, and an electrical connector 628 that is configured to be coupled to an LRU of the aircraft. As shown in FIG. 6, the surface-mountable antenna array 602 has substantially the same form factor (e.g., footprint) and/or mounting hole pattern as the typical radio altimeter antenna 620. For example, a width of the surface-mountable antenna array 602 is substantially similar to a width of the typical radio altimeter antenna 620, and mounting holes in the surface-mountable antenna array 602 may be located in approximately the same locations as mounting holes in the typical radio altimeter antenna 620, as indicated by the dotted lines in FIG. 6. As such, the surface-mountable antenna array 602 of the combined radio altimeter/Doppler radar device may be coupled to the aircraft in the same location as the typical radio altimeter antenna 620, without substantially increasing a footprint occupied on the surface of the aircraft by the surface-mountable antenna array 602 and/or without requiring new mounting holes or other modifications to the aircraft.

Figure 7:
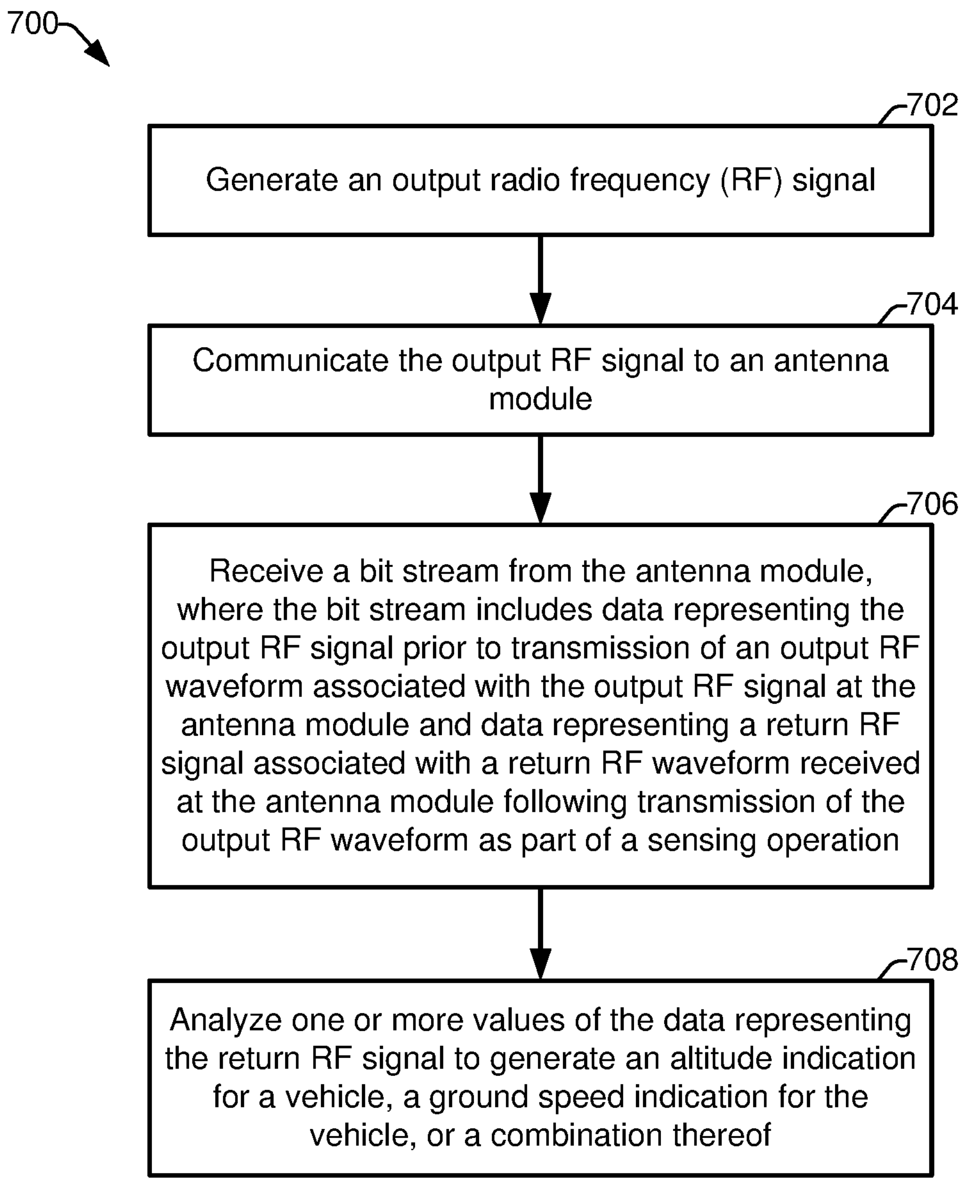
FIG. 7 is a diagram that illustrates a flow chart of an example of a method of measuring an altitude and/or ground speed of a vehicle using a radio device that includes a surface-mountable antenna array according to one or more aspects of the present disclosure.

FIG. 7 is a flowchart that illustrates an example of a method 700 of measuring an altitude and/or ground speed of a vehicle using a radio device that includes a surface-mountable antenna array according to one or more aspects of the present disclosure. The radio device can provide radio altimeter functionality, Doppler radar functionality, or a combination of radio altimeter functionality and Doppler radar functionality. The method 700 can be initiated, performed, or controlled by one or more processors executing instructions, or by circuitry configured to cause performance of one or more operations, such as resides within the RF unit 102 of FIG. 1, the RF unit 202 of FIG. 2, or a combination thereof.

In some implementations, the method 700 includes, at block 702, generating an output RF signal. For example, the RF unit 102 of FIG. 1 can generate an output RF signal. The method 700 also includes, at block 704, communicating the output RF signal to an antenna module. For example, the RF unit 102 of FIG. 1 can communicate the RF signal to the surface-mountable antenna module 104 via the RF cable 106.

The method 700 includes, at block 706, receiving a bit stream from the antenna module. For example, the RF unit 102 of FIG. 1 can receive a bit stream generated by the surface-mountable antenna module 104. The bit stream includes data representing the output RF signal prior to transmission of an output RF waveform associated with the output RF signal at the antenna module and data representing a return RF signal associated with a return RF waveform received at the antenna module following transmission of the output RF waveform as part of a sensing operation. The method 700 includes, at block 708, analyzing one or more values of the data representing the return RF signal to generate an altitude indication for a vehicle, a ground speed indication for the vehicle, or a combination thereof. For example, the RF unit 102 can analyze data extracted from the bit stream to generate an altitude indication for a vehicle, such as an aircraft, to which the surface-mountable antenna module 104 is coupled.

In some implementations, the method 700 can include more, fewer, and/or different steps without departing from the scope of the subject disclosure. For example, the method 700 can also include analyzing one or more additional values of the data representing the return RF signal to generate a ground speed indication for the vehicle. As another example, the method 700 can also include comparing a portion of the output RF signal to a portion of the bit stream associated with the output RF signal prior to transmission of the output RF waveform at the antenna module to generate an RF output discrepancy metric and generating an RF output discrepancy indication based on the RF output discrepancy metric exceeding an RF output discrepancy threshold. As another example, the method 700 can include generating a beamforming signal for transmission to the antenna module. The beamforming signal includes data indicative of a beamforming pattern, a beamforming sequence location, or a combination thereof.

Figure 8:
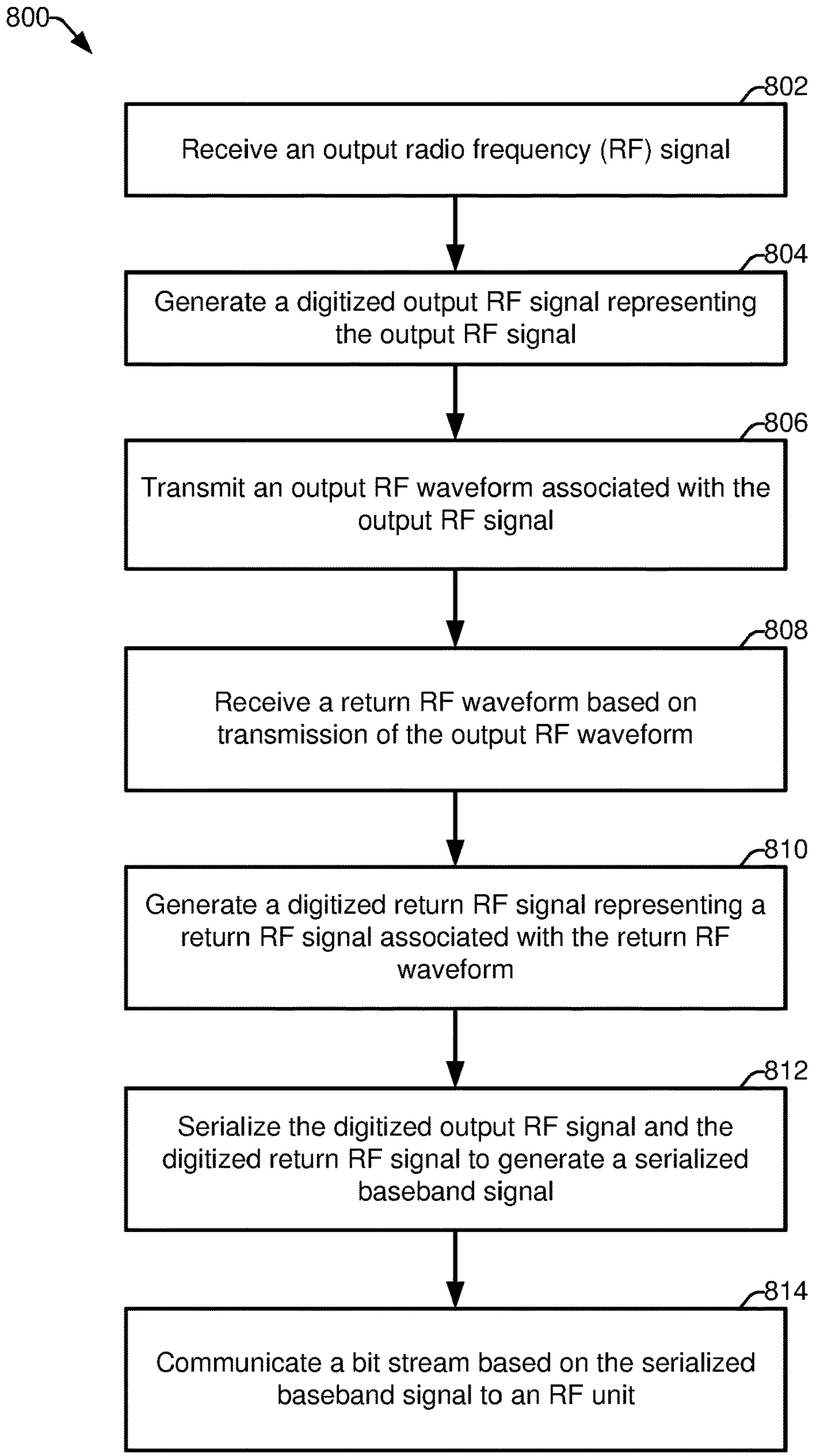
FIG. 8 is a diagram that illustrates a flow chart of an example of a method of measuring an altitude and/or ground speed of a vehicle using a radio device that includes a surface-mountable antenna array according to one or more aspects of the present disclosure.

FIG. 8 is a flowchart that illustrates an example of a method 800 of measuring an altitude and/or ground speed of a vehicle using a radio device that includes a surface-mountable antenna array according to one or more aspects of the present disclosure. The radio device can provide radio altimeter functionality, Doppler radar functionality, or a combination of radio altimeter functionality and Doppler radar functionality. The method 800 can be initiated, performed, or controlled by one or more processors executing instructions, or by circuitry configured to cause performance of one or more operations, such as resides within surface-mountable antenna module 104 of FIG. 1, the antenna subsystem 220 of FIG. 2, or a combination thereof.

In some implementations, the method 800 includes, at block 802, receiving an output RF signal. For example, the surface-mountable antenna module 104 of FIG. 1 can receive an output RF signal from the RF unit 102 via the RF cable 106. The method 800 also includes, at block 804, generating a digitized output RF signal representing the output RF signal. For example, the surface-mountable antenna module 104 of FIG. 1 can generate a digitized version of the output RF signal.

The method 800 includes, at block 806, transmitting an output RF waveform associated with the output RF signal. For example, the surface-mountable antenna module 104 of FIG. 1 can transmit an output RF waveform associated with the output RF signal received from the RF unit 102. The method 800 includes, at block 808, receiving a return RF waveform based on transmission of the output RF waveform. For example, the surface-mountable antenna module 104 of FIG. 1 can receive a return RF waveform that is a reflection, from the ground, of the output RF waveform.

The method 800 includes, at block 810, generating a digitized return RF signal representing a return RF signal associated with the return RF waveform. For example, the surface-mountable antenna module 104 of FIG. 1 can generate a digitized version of the return RF signal. The method 800 includes, at block 812, serializing the digitized output RF signal and the digitized return RF signal to generate a serialized baseband signal. For example, the surface-mountable antenna module 104 of FIG. 1 can serialize the digitized RF output signal and the digitized RF return signal to generate a serialized baseband signal.

The method 800 includes, at block 814, communicating a bit stream based on the serialized baseband signal to an RF unit. The RF unit is configured to generate an altitude measurement for a vehicle based on the serialized baseband signal. For example, the surface-mountable antenna module 104 of FIG. 1 can communicate the serialized baseband signal as a bit stream to the RF unit 102, and the RF unit 102 can determine an altitude of the vehicle, a ground speed of the vehicle, or both, based on analyzing the bit stream.

In some implementations, the method 800 can include more, fewer, and/or different steps without departing from the scope of the subject disclosure. For example, the method 800 can also include modulating the serialized baseband signal to generate a modulated digitized RF signal.

The methods described above with reference to FIGS. 7 and 8 can be implemented to realize one or more of the technical advantages described in more detail above. For example, the methods 700 and 800 can enable radio altimeter functionality, such as altitude measuring for a vehicle above the ground, that is more robust and accurate than using other types of radio altimeters. Additionally, the methods 700 and 800 can enable Doppler radar functionality, such as measuring a ground speed for the vehicle, that is more robust and accurate than using other types of Doppler radars. The radio altimeter functionality and/or Doppler radar functionality may be performed with a reduced, or eliminated, risk of being jammed or spoofed by a malicious entity.

Figure 9:
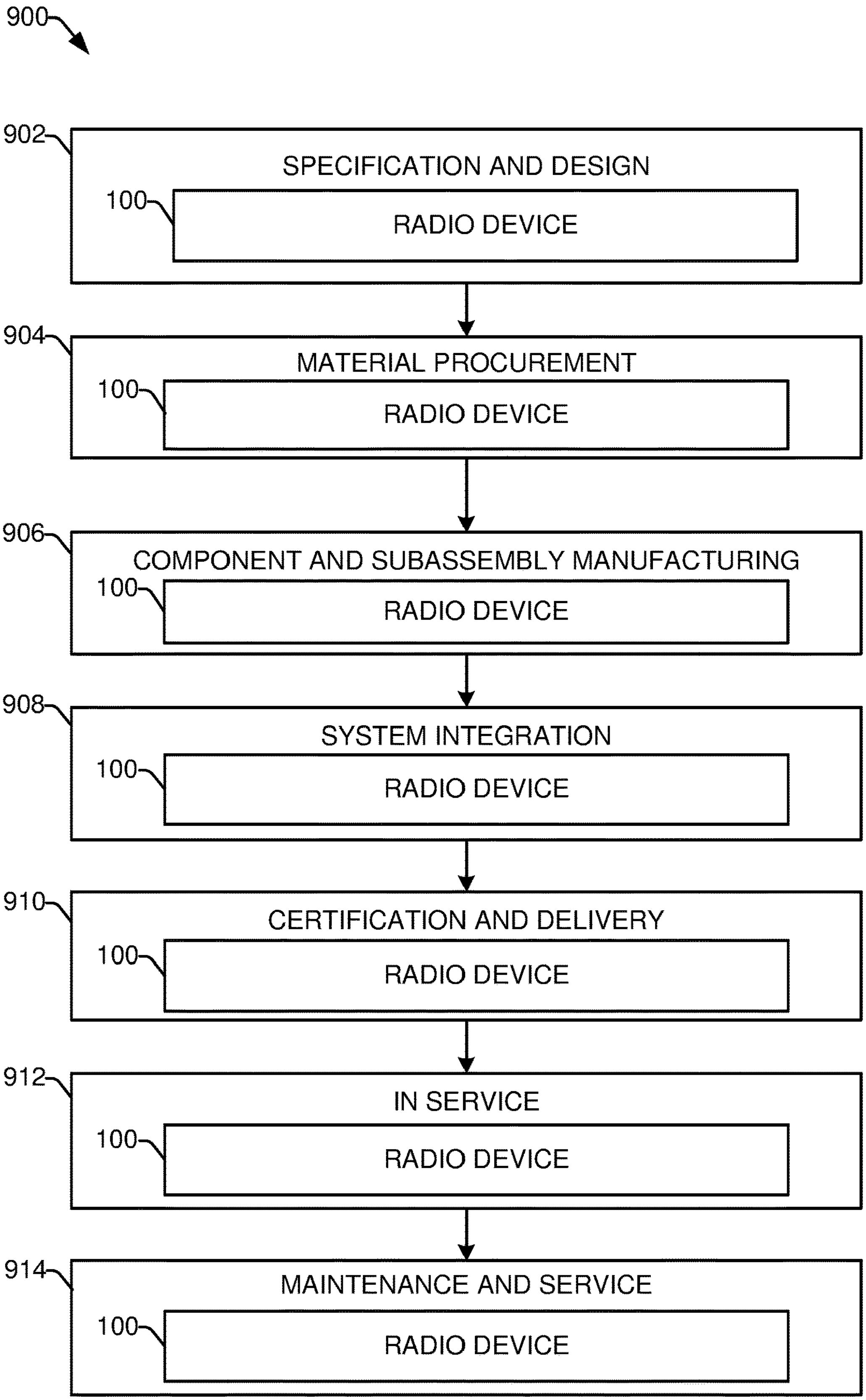
FIG. 9 is a flowchart illustrating an example of a life cycle of an aircraft including a radio device that includes a surface-mountable antenna module according to one or more aspects of the present disclosure.

Referring to FIG. 9, a flowchart illustrative of an example of a life cycle of an aircraft that includes a radio device that includes a surface-mountable antenna module is shown and designated 900. The radio device can provide radio altimeter functionality, Doppler radar functionality, or a combination of radio altimeter functionality and Doppler radar functionality. During pre-production, the exemplary method 900 includes, at 902, specification and design of an aircraft, such as the aircraft 502 described with reference to FIG. 5. During specification and design of the aircraft, the method 900 can include specification and design of the radio device that is configured to provide radio altimeter functionality, Doppler radar functionality, or both. At 904, the method 900 includes material procurement, which can include procuring materials for the radio device.

During production, the method 900 includes, at 906, component and subassembly manufacturing and, at 908, system integration of the aircraft. For example, the method 900 can include component and subassembly manufacturing of the radio device and system integration of the radio device. At 910, the method 900 includes certification and delivery of the aircraft and, at 912, placing the aircraft in service. Certification and delivery can include certification of the radio device to place the radio device in service. While in service by a customer, the aircraft can be scheduled for routine maintenance and service (which can also include modification, reconfiguration, refurbishment, and so on). At 914, the method 900 includes performing maintenance and service on the aircraft, which can include performing maintenance and service on the radio device. Alternatively, performing maintenance and service on the aircraft can include replacing a radio altimeter with a radio device of the present disclosure during a retrofit operation.

Each of the processes of the method 900 can be performed or carried out by a system integrator, a third party, and/or an operator (e.g., a customer). For the purposes of this description, a system integrator can include without limitation any number of aircraft manufacturers and major-system subcontractors; a third party can include without limitation any number of venders, subcontractors, and suppliers; and an operator can be an airline, leasing company, military entity, service organization, and so on.

Figure 10:
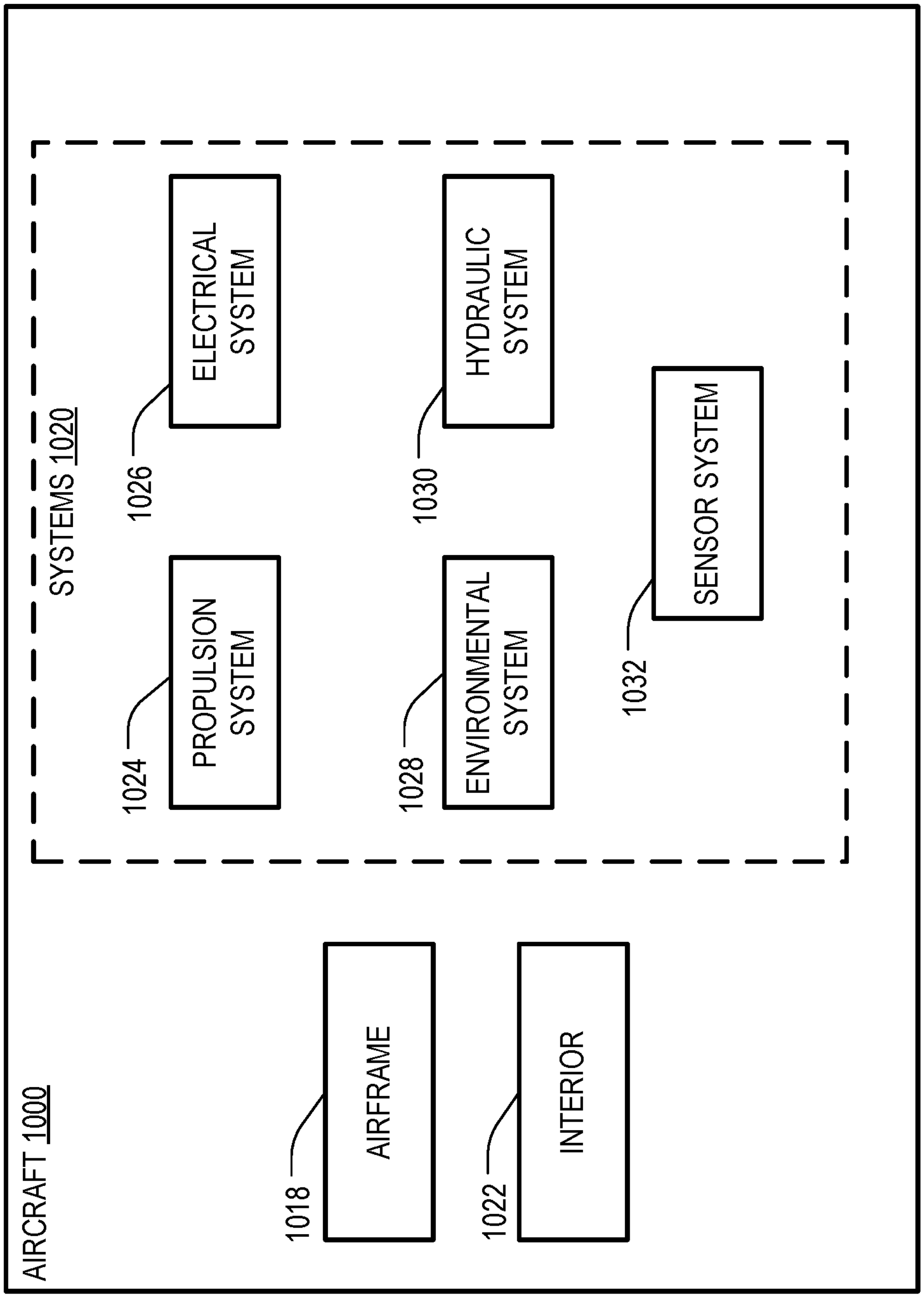
FIG. 10 is a block diagram of a particular implementation of the aircraft associated with the life cycle of FIG. 9.

Aspects of the disclosure can be described in the context of an example of a vehicle. A particular example of a vehicle is an aircraft 1000 as shown in FIG. 10. In the example of FIG. 10, the aircraft 1000 includes an airframe 1018 with a plurality of systems 1020 and an interior 1022. Examples of the plurality of systems 1020 include one or more of a propulsion system 1024, an electrical system 1026, an environmental system 1028, a hydraulic system 1030, and a sensor system 1032. Any number of other systems can be included. In the example of FIG. 10, the sensor system 1032 includes a radio device that is configured to provide radio altimeter functionality and/or Doppler radar functionality and that includes a surface-mountable antenna array, such as the radio device 100 of FIG. 1, the radio device 200 of FIG. 2, a radio device that includes the surface-mountable antenna array 300 of FIG. 3, a radio device that includes the system 400 of FIG. 4, the radio device used by the aircraft 502 of FIG. 5, the radio device 600 of FIG. 6, the radio device included in the aircraft associated with the method 900 of FIG. 9, or any combination thereof.

Figure 11:
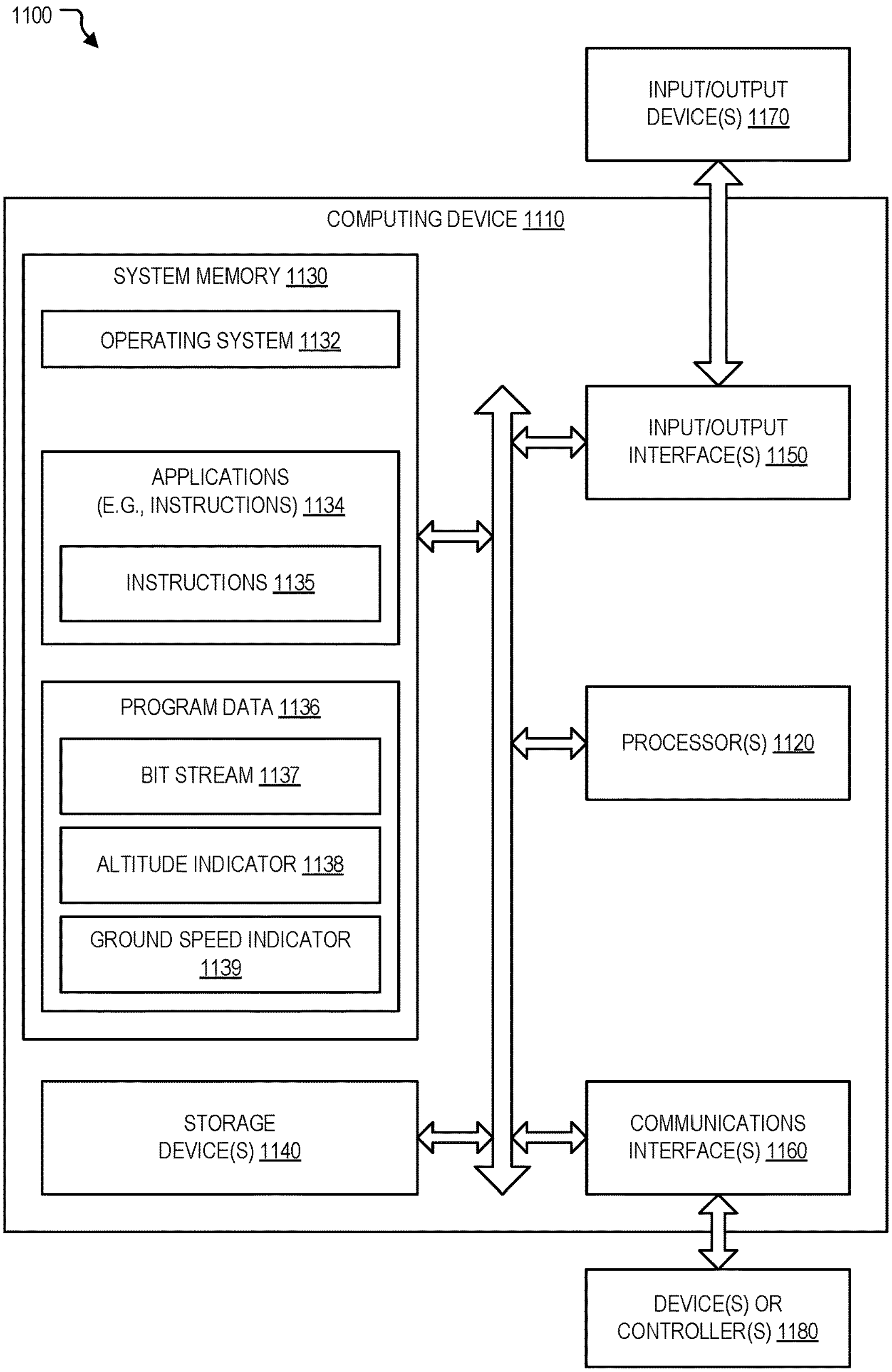
FIG. 11 is a block diagram of a computing environment including a computing device configured to support aspects of computer-implemented methods and computer-executable program instructions (or code) according to the present disclosure.

FIG. 11 is a block diagram of a computing environment 1100 including a computing device 1110 configured to support aspects of computer-implemented methods and computer-executable program instructions (or code) according to the present disclosure. For example, the computing device 1110, or portions thereof, is configured to execute instructions to initiate, perform, or control one or more operations described with reference to FIGS. 1-10.

The computing device 1110 includes one or more processors 1120. The processor(s) 1120 are configured to communicate with system memory 1130, one or more storage devices 1140, one or more input/output interfaces 1150, one or more communications interfaces 1160, or any combination thereof. The system memory 1130 includes volatile memory devices (e.g., random access memory (RAM) devices), nonvolatile memory devices (e.g., read-only memory (ROM) devices, programmable read-only memory, and flash memory), or both. The system memory 1130 stores an operating system 1132, which can include a basic input/output system for booting the computing device 1110 as well as a full operating system to enable the computing device 1110 to interact with users, other programs, and other devices. The system memory 1130 stores system (program) data 1136, such as a bit stream 1137, an altitude indicator 1138, a ground speed indicator 1139, or a combination thereof. The bit stream 1137 may include or correspond to the bit stream communicated between the RF unit 102 and the surface-mountable antenna module 104 of FIG. 1 or the RF unit 202 and the antenna subsystem 220 of FIG. 2. The altitude indicator 1138 may include or correspond to an altitude indicator generated by the RF unit 102 of FIG. 1 or the RF unit 202 of FIG. 2. The ground speed indicator 1139 may include or correspond to a ground speed indicator generated by the RF unit 102 of FIG. 1 or the RF unit 202 of FIG. 2.

The system memory 1130 includes one or more applications 1134 (e.g., sets of instructions) executable by the processor(s) 1120. As an example, the one or more applications 1134 include instructions executable by the processor(s) 1120 to initiate, control, or perform one or more operations described with reference to FIGS. 1-11. To illustrate, the one or more applications 1134 include instructions 1135 executable by the processor(s) 1120 to initiate, control, or perform one or more operations described with reference to the RF unit 102, the circuitry of the surface-mountable antenna module 104, or a combination thereof.

In a particular implementation, the system memory 1130 includes a non-transitory, computer readable medium storing the instructions 1135 that, when executed by the processor(s) 1120, cause the processor(s) 1120 to initiate, perform, or control operations to perform radio altimeter functionality, Doppler radar functionality, or both. The operations include generating an output RF signal, communicating the output RF signal to an antenna module, and receiving a bit stream from the antenna module. The bit stream includes data representing the output RF signal prior to transmission of an output RF waveform associated with the output RF signal at the antenna module and data representing a return RF signal associated with a return RF waveform received at the antenna module following transmission of the output RF waveform as part of a radio altimeter operation. The operations also include analyzing one or more values of the data representing the return RF signal to generate an altitude indication for a vehicle.

In the same or alternative particular implementations, the system memory 1130 includes a non-transitory, computer readable medium (e.g., a computer-readable storage device) storing the instructions 1135 that, when executed by the processor(s) 1120, cause the processor(s) 1120 to initiate, perform, or control operations to perform radio altimeter functionality, Doppler radar functionality, or both. The operations include receiving an output RF signal, generating a digitized output RF signal representing the output RF signal, and transmitting an output RF waveform associated with the output RF signal. The operations also include receiving a return RF waveform based on transmission of the output RF waveform and generating a digitized return RF signal representing a return RF signal associated with the return RF waveform. The operations also include serializing the digitized output RF signal and the digitized return RF signal to generate a serialized baseband signal and communicating a bit stream based on the serialized baseband signal to an RF unit. The RF unit is configured to generate an altitude measurement for a vehicle based on the serialized baseband signal.

The one or more storage devices 1140 include nonvolatile storage devices, such as magnetic disks, optical disks, or flash memory devices. In a particular example, the storage devices 1140 include both removable and non-removable memory devices. The storage devices 1140 are configured to store an operating system, images of operating systems, applications (e.g., one or more of the applications 1134), and program data (e.g., the system program data 1136). In a particular aspect, the system memory 1130, the storage devices 1140, or both, include tangible computer-readable media. In a particular aspect, one or more of the storage devices 1140 are external to the computing device 1110.

The one or more input/output interfaces 1150 enable the computing device 1110 to communicate with one or more input/output devices 1170 to facilitate user interaction. For example, the one or more input/output interfaces 1150 can include a display interface, an input interface, or both. For example, the input/output interface 1150 is adapted to receive input from a user, to receive input from another computing device, or a combination thereof. In some implementations, the input/output interface 1150 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 1170 includes one or more user interface devices and displays, including some combination of buttons, keyboards, pointing devices, displays, speakers, microphones, touch screens, and other devices.

The processor(s) 1120 are configured to communicate with devices or controllers 1180 via the one or more communications interfaces 1160. For example, the one or more communications interfaces 1160 can include a network interface. The devices or controllers 1180 can include, for example, a controller for the surface-mountable antenna module 104, one or more other devices, or any combination thereof.

In conjunction with the described systems and methods, an apparatus for measuring an altitude and/or ground speed of a vehicle is disclosed that includes means for generating an output RF signal. In some implementations, the means for generating corresponds to the RF unit 102, the RF unit 202, the DSP 204, one or more other circuits or devices configured to generate an output RF signal, or a combination thereof.

The apparatus also includes means for communicating the output RF signal to an antenna. For example, the means for communicating can correspond to the RF unit 102, the RF cable 106, the RF unit 202, the DAC 206, the PA 208, the diplexer 210, the RF cable 218, one or more other circuits or devices configured to communicate an output RF signal, or a combination thereof.

The apparatus also includes means for receiving a bit stream from the antenna. For example, the means for receiving can correspond to the RF unit 102, the RF cable 106, the RF unit 202, the diplexer 210, the demodulator 212, the deserializer 214, one or more other circuits or devices configured to receive a bit stream, or a combination thereof. The bit stream includes data representing the output RF signal prior to transmission of an output RF waveform associated with the output RF signal at the antenna module and data representing a return RF signal associated with a return RF waveform received at the antenna module following transmission of the output RF waveform as part of a radio altimeter or Doppler radar operation.

The apparatus also includes means for analyzing one or more values of the data representing the return RF signal to generate an altitude indication for a vehicle. For example, the means for analyzing can correspond to the RF unit 102, the RF unit 202, the DSP 204, one or more other circuits or devices configured to analyze one or more values of data of a bit stream to generate an altitude indication, or a combination thereof.

Additionally, or alternatively, the apparatus includes means for analyzing one or more values of the data representing the return RF signal to generate a ground speed indication for a vehicle. For example, the means for analyzing can correspond to the RF unit 102, the RF unit 202, the DSP 204, one or more other circuits or devices configured to analyze one or more values of data of a bit stream to generate a ground speed indication, or a combination thereof.

In the same or alternate implementations, an apparatus for measuring an altitude and/or ground speed of a vehicle is disclosed that includes means for receiving an output RF signal. In some implementations, the means for receiving corresponds to the surface-mountable antenna module 104, the antenna subsystem 220, the diplexer 222, the directional coupler 224, the surface-mountable antenna array 504, the surface-mountable antenna array 602, one or more other circuits or devices configured to receive an output RF signal, or a combination thereof.

The apparatus also includes means for generating a digitized output RF signal representing the output RF signal. For example, the means for generating can correspond to the surface-mountable antenna module 104, the antenna subsystem 220, the ADC 226, the surface-mountable antenna array 504, the surface-mountable antenna array 602, the circuitry layer 612, one or more other circuits or devices configured to receive an output RF signal, or a combination thereof.

The apparatus also includes means for transmitting an output RF waveform associated with the output RF signal. For example, the means for transmitting can correspond to the surface-mountable antenna module 104, the antenna subsystem 220, the switch 236, the antenna controller state machine 238, the beam forming network 240, the antenna array 250, the antenna array 320, the beam forming network 402, the antenna array 404, the surface-mountable antenna array 504, the surface-mountable antenna array 602, the circuitry layer 612, the beam forming network 610, the antenna array 608, one or more other circuits or devices configured to transmit an output RF waveform, or a combination thereof.

The apparatus also includes means for receiving a return RF waveform based on transmission of the output RF waveform. For example, the means for receiving can correspond to the surface-mountable antenna module 104, the antenna subsystem 220, the switch 236, the antenna controller state machine 238, the beam forming network 240, the antenna array 250, the antenna array 320, the beam forming network 402, the antenna array 404, the surface-mountable antenna array 504, the surface-mountable antenna array 602, the circuitry layer 612, the beam forming network 610, the antenna array 608, one or more other circuits or devices configured to receive a return RF waveform, or a combination thereof.

The apparatus also includes means for generating a digitized return RF signal representing a return RF signal associated with the return RF waveform. For example, the means for generating can correspond to the surface-mountable antenna module 104, the antenna subsystem 220, the ADC 234, the surface-mountable antenna array 504, the surface-mountable antenna array 602, the circuitry layer 612, one or more other circuits or devices configured to generate a digitized return RF signal, or a combination thereof.

The apparatus also includes means for serializing the digitized output RF signal and the digitized return RF signal to generate a serialized baseband signal. For example, the means for serializing can correspond to the surface-mountable antenna module 104, the antenna subsystem 220, the serializer 232, the surface-mountable antenna array 504, the surface-mountable antenna array 602, the circuitry layer 612, one or more other circuits or devices configured to serialize a digitized output RF signal and a digitized return RF signal to generate a serialized baseband signal, or a combination thereof.

The apparatus also includes means for communicating a bit stream based on the serialized baseband signal to an RF unit. For example, the means for communicating can correspond to the surface-mountable antenna module 104, the antenna subsystem 220, the surface-mountable antenna array 504, the surface-mountable antenna array 602, the circuitry layer 612, one or more other circuits or devices configured to communicate a bit stream based on a serialized baseband signal, or a combination thereof. The RF unit is configured to generate an altitude measurement, a ground speed measurement, or both for a vehicle based on the serialized baseband signal.

In some implementations, a non-transitory, computer readable medium stores instructions that, when executed by one or more processors, cause the one or more processors to initiate, perform, or control operations to perform part or all of the functionality described above. For example, the instructions can be executable to implement one or more of the operations or methods of FIGS. 1-11. In some implementations, part or all of one or more of the operations or methods of FIGS. 1-11 can be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

Further, the disclosure comprises embodiments according to the following examples:

According to Example 1, a surface-mountable antenna module includes: a housing configured to mount to an external surface of a vehicle, a receiver configured to receive an output radio frequency (RF) signal, an antenna configured to transmit the output RF signal and receive a return RF signal, circuitry coupled to the antenna, and an electrical connector coupled to the circuitry. The circuitry is configured to generate a digitized output RF signal and generate a digitized return RF signal. The electrical connector is configured to output data representing the digitized output RF signal and the digitized return RF signal.

Example 2 includes the surface-mountable antenna module of Example 1, wherein the antenna includes an antenna array.

Example 3 includes the surface-mountable antenna module of Example 2, wherein the antenna array includes a first antenna patch having a substantially square shape with a side of a length of at least approximately one-fourth of a wavelength of the return RF signal.

Example 4 includes the surface-mountable antenna module of Example 3, wherein the antenna array includes a second antenna patch substantially identical to the first antenna patch, wherein the second antenna patch is positioned a distance from the first antenna patch, and wherein the distance is at least approximately one-half of the wavelength of the return RF signal.

Example 5 includes the surface-mountable antenna module of any of Examples 2 to 4, wherein the antenna array is configured to have a mounting hole pattern selected such that the surface-mountable antenna module is compatible with an Aeronautical Radio, Inc. (ARINC) 707 standard radio altimeter footprint.

Example 6 includes the surface-mountable antenna module of any of Examples 2 to 5, further including a beamformer coupled to the antenna, wherein the beamformer is configured to form a plurality of beams of the antenna array according to a beamforming pattern.

Example 7 includes the surface-mountable antenna module of Example 6, wherein the beamforming pattern includes a preconfigured beamforming network configuration.

Example 8 includes the surface-mountable antenna module of Example 7, wherein the preconfigured beamforming network configuration is established according to a two-dimensional Butler matrix.

Example 9 includes the surface-mountable antenna module of Example 6, wherein the beamforming pattern corresponds to an active beamforming network.

Example 10 includes the surface-mountable antenna module of Example 9, wherein the beamforming pattern is based on an altitude of the vehicle.

Example 11 includes the surface-mountable antenna module of Example 9 or Example 10, wherein the beamforming pattern is based on a global positioning system denied (GPS-denied) status of the vehicle.

Example 12 includes the surface-mountable antenna module of any of Examples 9 to 11, wherein the beamforming pattern is based on a speed of the vehicle, an attitude of the vehicle, or a combination thereof.

Example 13 includes the surface-mountable antenna module of any of Examples 6 to 12, further including a state machine coupled to the beamformer, the state machine configured to determine a beam of the plurality of beams.

Example 14 includes the surface-mountable antenna module of any of Examples 1 to 13, wherein the electrical connector includes a coaxial cable connector.

Example 15 includes the surface-mountable antenna module of Example 14, wherein the electrical connector is coupled to the receiver and configured to receive the output RF signal.

Example 16 includes the surface-mountable antenna module of Example 14 or Example 15, wherein the electrical connector is Aeronautical Radio, Inc. (ARINC) 707 compatible.

Example 17 includes the surface-mountable antenna module of any of Examples 1 to 16, wherein the surface-mountable antenna module is agnostic as to a length of a cable coupled to the receiver.

Example 18 includes the surface-mountable antenna module of any of Examples 1 to 17, wherein a cable coupled to receiver has a length that is not substantially equal to forty feet, eighty feet, or fifty-seven feet.

Example 19 includes the surface-mountable antenna module of any of Examples 1 to 18, further including an analog-to-digital converter (ADC), a serializer, a modulator, a clock, or a combination thereof.

Example 20 includes the surface-mountable antenna module of Example 19, wherein the electrical connector is configured to receive digital power for the ADC, the serializer, the modulator, the clock, or the combination thereof.

Example 21 includes the surface-mountable antenna module of any of Examples 1 to 20, wherein the vehicle is an aircraft.

According to Example 22, a radio device includes a radio frequency (RF) unit and a surface-mountable antenna module configured to be coupled to the RF unit. The RF unit includes a transmitter configured to transmit an output RF signal, a first receiver configured to receive a bit stream, and a processing unit configured to analyze a portion of the bit stream to determine an altitude measurement for a vehicle, a speed measurement for the vehicle, or a combination thereof. The surface-mountable antenna module includes a housing configured to mount to an external surface of the vehicle, a second receiver configured to receive the output RF signal, an antenna configured to transmit the output RF signal and receive a return RF signal, circuitry coupled to the first receiver and the second receiver, and an electrical connector coupled to the circuitry. The circuitry is configured to generate a digitized output RF signal and generate a digitized return RF signal. The electrical connector is configured to communicate the digitized output RF signal and the digitized return RF signal as part of the bit stream.

According to Example 23, an aircraft includes a radio device and a navigation display coupled to the radio device. The radio device includes a radio frequency (RF) unit and a surface-mountable antenna module coupled to the RF unit. The RF unit includes a transmitter configured to transmit an output RF signal, a first receiver configured to receive a bit stream, a processing unit configured to analyze a portion of the bit stream to determine an altitude measurement for the aircraft, a speed measurement for the aircraft, or a combination thereof. The surface-mountable antenna module includes a housing configured to mount to an external surface of the aircraft, a second receiver configured to receive the output RF signal, an antenna configured to transmit the output RF signal and receive a return RF signal, circuitry coupled to the first receiver and the second receiver, and an electrical connector coupled to the circuitry. The circuitry is configured to generate a digitized output RF signal and generate a digitized return RF signal. The electrical connector is configured to communicate the digitized output RF signal and the digitized return RF signal as part of the bit stream. The navigation display is configured to display an altitude reading based on the bit stream.

Example 24 includes the aircraft of Example 23, further including a ground speed indicator coupled to the radio device, wherein the ground speed indicator is configured to display a ground speed of the aircraft based on the bit stream.

According to Example 25, a method includes generating an output radio frequency (RF) signal, communicating the output RF signal to an antenna module, and receiving a bit stream from the antenna module. The bit stream includes data representing the output RF signal prior to transmission of an output RF waveform associated with the output RF signal at the antenna module and data representing a return RF signal associated with a return RF waveform received at the antenna module following transmission of the output RF waveform as part of a sensing operation. The method includes analyzing one or more values of the data representing the return RF signal to generate an altitude indication for a vehicle, a ground speed indication for the vehicle, or a combination thereof.

Example 26 includes the method of Example 25, wherein the altitude indication is based on a delay between the output RF signal and the return RF signal.

Example 27 includes the method of Example 25 or Example 26, wherein the ground speed indication is based on a Doppler shift between the output RF signal and the return RF signal.

Example 28 includes the method of any of Examples 25 to 27, further including comparing a portion of the output RF signal to a portion of the bit stream associated with the output RF signal prior to transmission of the output RF waveform at the antenna module to generate an RF output discrepancy metric and generating an RF output discrepancy indication based on the RF output discrepancy metric exceeding an RF output discrepancy threshold.

Example 29 includes the method of any of Examples 25 to 28, wherein the RF waveform has a frequency in a range of approximately 13.25 gigahertz (GHz) to approximately 13.4 GHz.

Example 30 includes the method of any of Examples 25 to 29, wherein the RF signal is associated with an orthogonal frequency division multiplexing (OFDM) modulation scheme, a direct sequence spread spectrum (DSSS) modulation scheme, or a combination thereof.

Example 31 includes the method of any of Examples 25 to 30, further including generating a beamforming signal for transmission to the antenna module, wherein the beamforming signal includes data indicative of a beamforming pattern, a beamforming sequence location, or a combination thereof.

Example 32 includes the method of Example 31, wherein the beamforming pattern includes a preconfigured beamforming network configuration.

Example 33 includes the method of Example 32, wherein the preconfigured beamforming network configuration is established according to a two-dimensional Butler matrix.

Example 34 includes the method of Example 31, wherein the beamforming pattern corresponds to an active beamforming network.

Example 35 includes the method of Example 34, wherein the beamforming pattern is based on an altitude of the vehicle, a speed of the vehicle, an attitude of the vehicle, a global positioning system denied (GPS-denied) status of the vehicle, or a combination thereof.

According to Example 36, a system includes one or more processors configured to generate an output RF signal, communicate the output RF signal to an antenna module, and receive a bit stream from the antenna module. The bit stream includes data representing the output RF signal prior to transmission of an output RF waveform associated with the output RF signal at the antenna module and data representing a return RF signal associated with a return RF waveform received at the antenna module following transmission of the output RF waveform as part of a sensing operation. The one or more processors are configured to analyze one or more values of the data representing the return RF signal to generate an altitude indication for a vehicle, a ground speed indication for the vehicle, or a combination thereof.

Example 37 includes the system of Example 36, wherein the altitude indication is based on a delay between the output RF signal and the return RF signal.

Example 38 includes the system of Example 36 or Example 37, wherein the ground speed indication is based on a Doppler shift between the output RF signal and the return RF signal.

Example 39 includes the system of any of Examples 36 to 38, wherein the one or more processors are further configured to compare a portion of the output RF signal to a portion of the bit stream associated with the output RF signal prior to transmission of the output RF waveform at the antenna module to generate an RF output discrepancy metric and generate an RF output discrepancy indication based on the RF output discrepancy metric exceeding an RF output discrepancy threshold.

Example 40 includes the system of any of Examples 36 to 39, wherein the one or more processors are further configured to generate a beamforming signal for transmission to the antenna module, and wherein the beamforming signal includes data indicative of a beamforming pattern, a beamforming sequence location, or a combination thereof.

According to Example 41, a non-transitory, computer-readable medium includes instructions that, when executed by one or more processors, cause the one or more processors to perform operations including generating an output RF signal, communicating the output RF signal to an antenna module, and receiving a bit stream from the antenna module. The bit stream includes data representing the output RF signal prior to transmission of an output RF waveform associated with the output RF signal at the antenna module and data representing a return RF signal associated with a return RF waveform received at the antenna module following transmission of the output RF waveform as part of a sensing operation. The operations include analyzing one or more values of the data representing the return RF signal to generate an altitude indication for a vehicle, a ground speed of the vehicle, or a combination thereof.

Example 42 includes the non-transitory, computer-readable medium of Example 41, wherein the operations further include demodulating the bit stream to generate a serialized baseband signal and deserializing the serialized baseband signal to generate the output RF signal and the return RF signal.

Example 43 includes the non-transitory, computer-readable medium of Example 41 or Example 42, wherein the output RF waveform has a frequency in a range of approximately 13.25 gigahertz (GHz) to approximately 13.4 GHz.

Example 44 includes the non-transitory, computer-readable medium of any of Examples 41 to 43, wherein the output RF signal is associated with an orthogonal frequency division multiplexing (OFDM) modulation scheme, a direct sequence spread spectrum (DSSS) modulation scheme, or a combination thereof.

According to Example 45, a method includes receiving an output RF signal, generating a digitized output RF signal representing the output RF signal, transmitting an output RF waveform associated with the output RF signal, receiving a return RF waveform based on transmission of the output RF waveform, generating a digitized return RF signal representing a return RF signal associated with the return RF waveform, serializing the digitized output RF signal and the digitized return RF signal to generate a serialized baseband signal, and communicating a bit stream based on the serialized baseband signal to an RF unit. The RF unit is configured to generate an altitude measurement, a ground speed measurement, or both for a vehicle based on the serialized baseband signal.

Example 46 includes the method of Example 45, further including modulating the serialized baseband signal to generate a modulated digitized RF signal, wherein the bit stream represents the modulated digitized RF signal.

Example 47 includes the method of Example 45 or Example 46, wherein the output RF waveform has a frequency in a range of approximately 13.25 gigahertz (GHz) to approximately 13.4 GHz.

Example 48 includes the method of any of Examples 45 to 47, wherein the output RF signal is associated with an orthogonal frequency division multiplexing (OFDM) modulation scheme, a direct sequence spread spectrum (DSSS) modulation scheme, or a combination thereof.

Example 49 includes the method of any of Examples 45 to 48, wherein transmitting the output RF waveform includes beamforming a plurality of beams via an antenna array according to a beamforming pattern, and wherein the plurality of beams includes one or more selected waveforms from a preset family of waveforms.

Example 50 includes the method of Example 49, wherein the beamforming pattern includes a preconfigured beamforming network configuration.

Example 51 includes the method of Example 50, wherein the preconfigured beamforming network configuration is established according to a two-dimensional Butler matrix.

Example 52 includes the method of Example 49, wherein the beamforming pattern corresponds to an active beamforming network configuration.

Example 53 includes the method of Example 52, wherein the active beamforming network configuration is based on an altitude of the vehicle, a speed of the vehicle, an attitude of the vehicle, a global positioning system denied (GPS-denied) status of the vehicle, or a combination thereof.

According to Example 54, a system includes one or more processors configured to receive an output RF signal, generate a digitized output RF signal representing the output RF signal, transmit an output RF waveform associated with the output RF signal, receive a return RF waveform based on transmission of the output RF waveform, generate a digitized return RF signal representing a return RF signal associated with the return RF waveform, serialize the digitized output RF signal and the digitized return RF signal to generate a serialized baseband signal, and communicate a bit stream based on the serialized baseband signal to an RF unit. The RF unit is configured to generate an altitude measurement, a ground speed measurement, or both for a vehicle based on the serialized baseband signal.

Example 55 includes the system of Example 54, wherein the one or more processors are further configured to modulate the serialized baseband signal to generate a modulated digitized RF signal, wherein the bit stream represents the modulated digitized RF signal.

Example 56 includes the system of Example 54 or Example 55, wherein the one or more processors are further configured to beamform a plurality of beams via an antenna array according to a beamforming pattern, and wherein the plurality of beams includes one or more selected waveforms from a preset family of waveforms.

Example 57 includes the system of Example 56, wherein the beamforming pattern includes a preconfigured beamforming network configuration.

Example 58 includes the system of Example 57, wherein the preconfigured beamforming network configuration is established according to a two-dimensional Butler matrix.

Example 59 includes the system of Example 56, wherein the beamforming pattern corresponds to an active beamforming network.

Example 60 includes the system of Example 59, wherein the beamforming pattern is based on an altitude of the vehicle, a speed of the vehicle, an attitude of the vehicle, a global positioning system denied (GPS-denied) status of the vehicle, or a combination thereof.

According to Example 61, a non-transitory, computer-readable medium includes instructions that, when executed by one or more processors, cause the one or more processors to perform operations including receiving an output RF signal, generating a digitized output RF signal representing the output RF signal, transmitting an output RF waveform associated with the output RF signal, receiving a return RF waveform based on transmission of the output RF waveform, generating a digitized return RF signal representing a return RF signal associated with the return RF waveform, serializing the digitized output RF signal and the digitized return RF signal to generate a serialized baseband signal, and communicating a bit stream based on the serialized baseband signal to an RF unit. The RF unit is configured to generate an altitude measurement, a ground speed measurement, or both for a vehicle based on the serialized baseband signal.

Example 62 includes the non-transitory, computer-readable medium of Example 61, wherein the operations further include modulating the serialized baseband signal to generate a modulated digitized RF signal, and wherein the bit stream represents the modulated digitized RF signal.

Example 63 includes the non-transitory, computer-readable medium of Example 61 or Example 62, wherein transmitting the output RF waveform includes beamforming a plurality of beams via an antenna array according to a beamforming pattern, and wherein the plurality of beams includes one or more selected waveforms from a preset family of waveforms.

Example 64 includes the non-transitory, computer-readable medium of Example 63, wherein the beamforming pattern corresponds to an active beamforming network.

What is claimed is:

1. A method comprising:

generating an output radio frequency (RF) signal;

communicating the output RF signal to an antenna module;

receiving a bit stream from the antenna module, wherein the bit stream comprises:

a digitized output RF signal that is a digitized version of the output RF signal prior to transmission of an output RF waveform associated with the output RF signal at the antenna module; and data representing a return RF signal associated with a return RF waveform received at the antenna module following transmission of the output RF waveform as part of a sensing operation; and analyzing one or more values of the data representing the return RF signal to generate an altitude indication for a vehicle, a ground speed indication for the vehicle, or a combination thereof.

2. The method of claim 1, wherein the altitude indication is based on a delay between the output RF signal and the return RF signal.

3. The method of claim 1, wherein the ground speed indication is based on a Doppler shift between the output RF signal and the return RF signal.

4. The method of claim 1, further comprising:

comparing a portion of the output RF signal to a portion of the bit stream associated with the digitized version of the output RF signal prior to transmission of the output RF waveform at the antenna module to generate an RF output discrepancy metric; and generating an RF output discrepancy indication based on the RF output discrepancy metric exceeding an RF output discrepancy threshold.

5. The method of claim 1, wherein the output RF waveform has a frequency in a range of approximately 13.25 gigahertz (GHz) to approximately 13.4 GHz.

6. The method of claim 1, wherein the output RF signal is associated with an orthogonal frequency division multiplexing (OFDM) modulation scheme, a direct sequence spread spectrum (DSSS) modulation scheme, or a combination thereof.

7. The method of claim 1, further comprising generating a beamforming signal for transmission to the antenna module, wherein the beamforming signal comprises data indicative of a beamforming pattern, a beamforming sequence location, or a combination thereof.

8. The method of claim 7, wherein the beamforming pattern comprises a preconfigured beamforming network configuration.

9. The method of claim 8, wherein the preconfigured beamforming network configuration is established according to a two-dimensional Butler matrix.

10. The method of claim 7, wherein the beamforming pattern corresponds to an active beamforming network.

11. The method of claim 10, wherein the beamforming pattern is based on an altitude of the vehicle, a speed of the vehicle, an attitude of the vehicle, a global positioning system denied (GPS-denied) status of the vehicle, or a combination thereof.

12. A system comprising:

one or more processors configured to:

generate an output radio frequency (RF) signal;

communicate the output RF signal to an antenna module;

receive a bit stream from the antenna module, wherein the bit stream comprises:

a digitized output RF signal that is a digitized version of the output RF signal prior to transmission of an output RF waveform associated with the output RF signal at the antenna module; and data representing a return RF signal associated with a return RF waveform received at the antenna module following transmission of the output RF waveform as part of a sensing operation; and analyze one or more values of the data representing the return RF signal to generate an altitude indication for a vehicle, a ground speed indication for the vehicle, or a combination thereof.

13. The system of claim 12, wherein the altitude indication is based on a delay between the output RF signal and the return RF signal.

14. The system of claim 12, wherein the ground speed indication is based on a Doppler shift between the output RF signal and the return RF signal.

15. The system of claim 12, wherein the one or more processors are further configured to:

compare a portion of the output RF signal to a portion of the bit stream associated with the digitized version of the output RF signal prior to transmission of the output RF waveform at the antenna module to generate an RF output discrepancy metric; and generate an RF output discrepancy indication based on the RF output discrepancy metric exceeding an RF output discrepancy threshold.

16. The system of claim 12, wherein the one or more processors are further configured to generate a beamforming signal for transmission to the antenna module, and wherein the beamforming signal comprises data indicative of a beamforming pattern, a beamforming sequence location, or a combination thereof.

17. A non-transitory, computer-readable medium comprising instructions that, when executed by one or more processors, cause the one or more processors to perform operations including:

generating an output radio frequency (RF) signal;

communicating the output RF signal to an antenna module;

receiving a bit stream from the antenna module, wherein the bit stream comprises:

a digitized output RF signal that is a digitized version of the output RF signal prior to transmission of an output RF waveform associated with the output RF signal at the antenna module; and data representing a return RF signal associated with a return RF waveform received at the antenna module following transmission of the output RF waveform as part of a sensing operation; and analyzing one or more values of the data representing the return RF signal to generate an altitude indication for a vehicle, a ground speed indication for the vehicle, or a combination thereof.

18. The non-transitory, computer-readable medium of claim 17, wherein the operations further comprise:

demodulating the bit stream to generate a serialized baseband signal; and deserializing the serialized baseband signal to generate the output RF signal and the return RF signal.

19. The non-transitory, computer-readable medium of claim 17, wherein the output RF waveform has a frequency in a range of approximately 13.25 gigahertz (GHz) to approximately 13.4 GHz.

20. The non-transitory, computer-readable medium of claim 17, wherein the output RF signal is associated with an orthogonal frequency division multiplexing (OFDM) modulation scheme, a direct sequence spread spectrum (DSSS) modulation scheme, or a combination thereof.

* * * * *